United States Patent
Eliyahu et al.

(10) Patent No.: US 12,202,193 B2
(45) Date of Patent: Jan. 21, 2025

(54) MENISCUS-CONFINED THREE-DIMENSIONAL ELECTRODEPOSITION

(71) Applicant: RAMOT AT TEL-AVIV UNIVERSITY LTD., Tel Aviv (IL)

(72) Inventors: David Eliyahu, Tel Aviv (IL); Noam Eliaz, Tel Aviv (IL); Eliezer Gileadi, Tel Aviv (IL)

(73) Assignee: RAMOT AT TEL-AVIV UNIVERSITY LTD. (IL)

( * ) Notice: Subject to any disclaimer, the term of this patent is extended or adjusted under 35 U.S.C. 154(b) by 695 days.

(21) Appl. No.: 17/277,634

(22) PCT Filed: Oct. 10, 2019

(86) PCT No.: PCT/IL2019/051110
§ 371 (c)(1),
(2) Date: Mar. 18, 2021

(87) PCT Pub. No.: WO2020/075173
PCT Pub. Date: Apr. 16, 2020

(65) Prior Publication Data
US 2021/0348288 A1 Nov. 11, 2021

Related U.S. Application Data

(60) Provisional application No. 62/744,148, filed on Oct. 11, 2018.

(51) Int. Cl.
*B29C 64/165* (2017.01)
*B22F 10/10* (2021.01)
(Continued)

(52) U.S. Cl.
CPC ............ *B29C 64/165* (2017.08); *B22F 10/10* (2021.01); *B22F 10/32* (2021.01); *B22F 10/85* (2021.01);
(Continued)

(58) Field of Classification Search
CPC ............. C25D 1/003; C25D 5/08; C25D 5/04
See application file for complete search history.

(56) References Cited

U.S. PATENT DOCUMENTS 5,641,391 A * 6/1997 Hunter .................... C25D 5/02
205/672
6,756,109 B2 * 6/2004 Warren ................ B01J 19/0046
428/209
(Continued)

FOREIGN PATENT DOCUMENTS

WO 2017055338 A1 4/2017

OTHER PUBLICATIONS

Hirt et al, "Local surface modifications via confined electrochemical deposition with FluidFM" RSC Adv., 2015, 84517-84522. (Year: 2015).*
(Continued)

*Primary Examiner* — Brian W Cohen
(74) *Attorney, Agent, or Firm* — McAndrews, Held & Malloy, Ltd.

(57) ABSTRACT

The invention relates to a process and a system for 3-dimentional (3D) fabrication of sub-micron structures and is established by local electrochemical deposition methods.

16 Claims, 10 Drawing Sheets

(51) Int. Cl.
| | |
|---|---|
| B22F 10/32 | (2021.01) |
| B22F 10/85 | (2021.01) |
| B22F 12/90 | (2021.01) |
| B29C 64/106 | (2017.01) |
| B29C 64/393 | (2017.01) |
| B33Y 10/00 | (2015.01) |
| B33Y 30/00 | (2015.01) |
| B33Y 50/02 | (2015.01) |
| C25D 1/00 | (2006.01) |
| C25D 5/04 | (2006.01) |
| C25D 21/12 | (2006.01) |

(52) U.S. Cl.
CPC ............ *B22F 12/90* (2021.01); *B29C 64/106* (2017.08); *B29C 64/393* (2017.08); *B33Y 10/00* (2014.12); *B33Y 30/00* (2014.12); *B33Y 50/02* (2014.12); *C25D 1/003* (2013.01); *C25D 5/04* (2013.01); *C25D 21/12* (2013.01)

(56) References Cited

U.S. PATENT DOCUMENTS

| | | | | |
|---|---|---|---|---|
| 7,955,486 B2* | 6/2011 | Yu | ........................... | C25D 17/00 205/133 |
| 2010/0300886 A1* | 12/2010 | Lin | ........................ | C25D 17/10 204/198 |
| 2013/0142566 A1* | 6/2013 | Yu | ........................... | H01L 24/49 205/114 |

OTHER PUBLICATIONS

Dmitry Momotenko et al., Write-Read 3D Patterning With a Dual-Channel Nanopipette, ACS Nano 2016, vol. 10, No. 9, pp. 8871-8878.
J.D. Madden and I.W. Hunter et al., Three-Dimensional Microfabrication by Localized Electrochemical Deposition, Journal of Microelectromechanical Systems, 1996, vol. 5, No. 1, pp. 24-32.
E.M. El-Giar et al., Localized Electrochemical Deposition of Copper Microstructure, Journal of the Electrochemical Society, 2000, vol. 147, No. 2, pp. 586-591.
A. Jansson et al., High-Resolution 3D Microstructures Made by Localized Electrodeposition of Nickel, Journal of the Electrochemical Society, 2000, vol. 147, No. 5, pp. 1810-1817.
S.H. Yeo and J.H. Choo, Effects of Rotor Electrode in the Fabrication of High Aspect Ratio Microstructures by Localized Electrochemical Deposition, Journal of Micromechanics and Microengineering, 2001, vol. 11, pp. 435-442.
R.A. Said, Localized Electro-Deposition (LED): The March Toward Process Development, Nanotechnology, 2004, vol. 15, pp. S649-S659.
J.C. Lin et al., On the Structure of Micrometer Copper Features Fabricated by Intermittent Micro-Anode Guided Electroplating, Electrochimica Acta, 2009, vol. 54, No. 24, pp. 5703-5708.
M.M. Sundaram et al., Mask-less Electrochemical Additive Manufacturing: A Feasibility Study, Journal of Manufacturing Science and Engineering, 2015, Article 021006, vol. 137, 9 pages.
F. Wang et al., Effects of Applied Potential and the Initial Gap Between Electrodes on Localized Electrochemical Deposition of Micrometer Copper Columns, Scientific Reports, 2016, Article 26270, vol. 6, 8 pages.
T. Leïchlé et al., Copper Electrodeposition Localized in Picoliter Droplets Using Microcantilever Arrays, Applied Physics Letters, 2006, Article 254108, vol. 88, No. 25, 5 pages.
A.P. Suryavanshi and M.-F. Yu, Probe-Based Electrochemical Fabrication of Freestanding Cu Nanowire Array, Applies Physics Letters, 2006, Article 083103, vol. 88, 4 pages.
J. Hu and M.-F. Yu, Meniscus-Confined Three-Dimensional Electrodeposition for Direct Writing of Wire Bonds, Science, 2010, vol. 329, No. 5989, pp. 313-316.
S.K. Seol et al., Electrodeposition-Based 3D Printing of Metallic Microarchitectures With Controlled Internal Structures, Small, 2015, vol. 11, No. 32, p. 3896-8902.
Z. Yi et al., Vertical, Capacitive Microelectromechanical Switches Produced via Direct Writing of Copper Wires, Microsystems & Nanoengineering, 2016, Article 16010, vol. 2, 7 pages.
S. Morsali et al., Multi-Physics Simulation of Metal Printing at Micro/Nanoscale Using Meniscus-Confined Electrodeposition: Effect of Nozzle Speed and Diameter, Journal of Applied Physics, 2017, Article 214305, vol. 121, No. 21, 11 pages.
A. Behroozfar et al., Microscale 3D Printing of Nanotwinned Copper, Advanced Materials, 2018, Article 2705107, vol. 30, 6 pages.
A. Meister et al., Nanodispenser for Attoliter Volume Deposition Using Atomic Force Microscopy Probes Modified by Focused-ion-beam Milling, Applied Physics Letters, 2004, vol. 85, No. 25, pp. 6260-6262.
A. Meister et al., FluidFM: Combining Atomic Force Microscopy and Nanofluidics in a Universal Liquid Delivery System for Single Cell Applications and Beyond, Nano Letters, 2009, vol. 9, No. 6, pp. 2501-2507.
L. Hirt et al., Template-Free 3D Microprinting of Metals Using a Force-Controlled Nanopipette for Layer-by-Layer Electrodeposition, Advanced Materials, 2016, vol. 28, No. 12, pp. 2311-2315.
J. C. Lin et al., Localized Electrochemical Deposition of Micrometer Copper Columns by Pulse Plating, Electrochimica Acta, 2010, vol. 55, No. 6. pp. 1888-1894.
S. Morsali et al., Multi-Physics Simulation of Metal Printing at Micro/Nanoscale Using Meniscus-Confined Electrodeposition: Effect of Environmental Humidity, Journal of Applied Physics, 2017, Article 24903, vol. 121, No. 2, 8 pages.

\* cited by examiner

Figure 3A
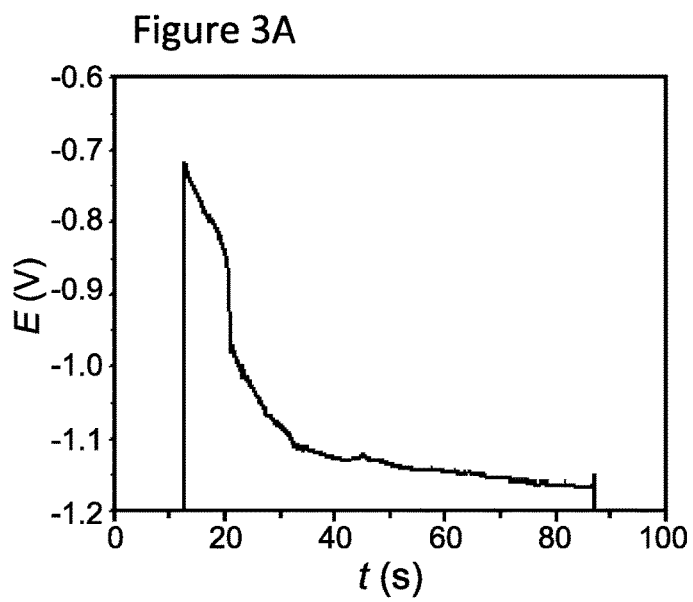
Figure 3B
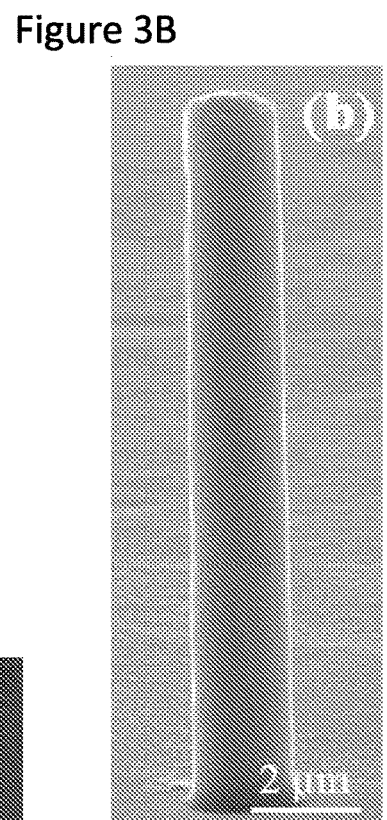
Figure 3C
Figure 3D
Figure 3E
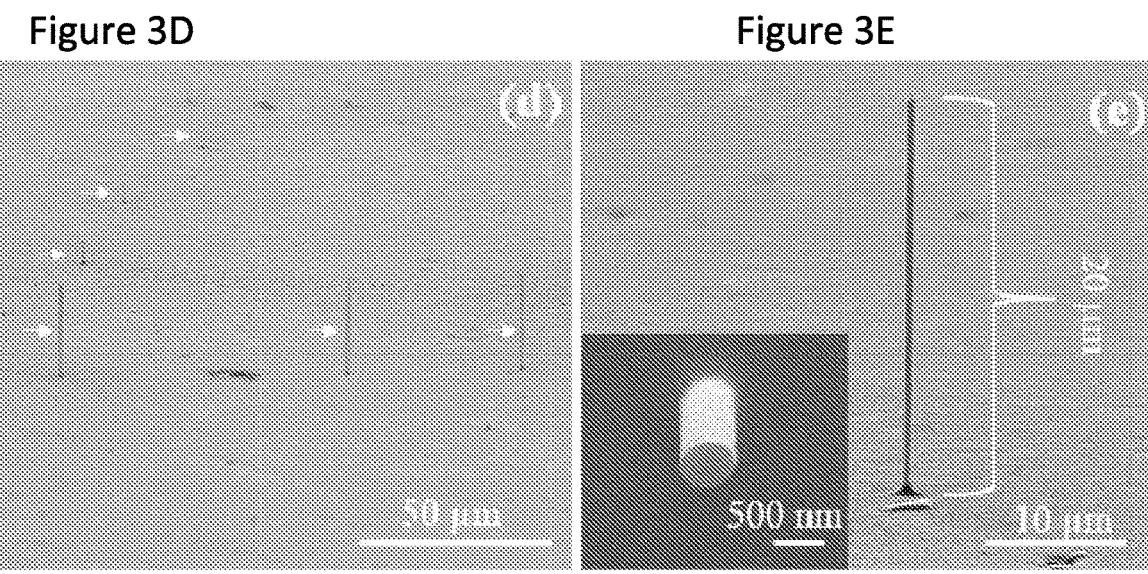

Grain size= 62.2±24.3 nm (n=45)

Grain size= 85.3 ± 25.1 nm (n=58)

Figure 7A
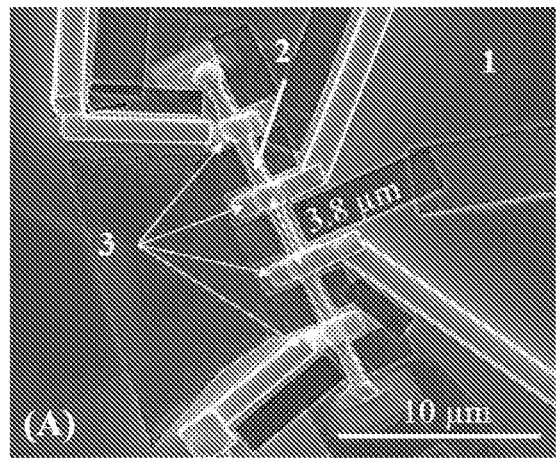
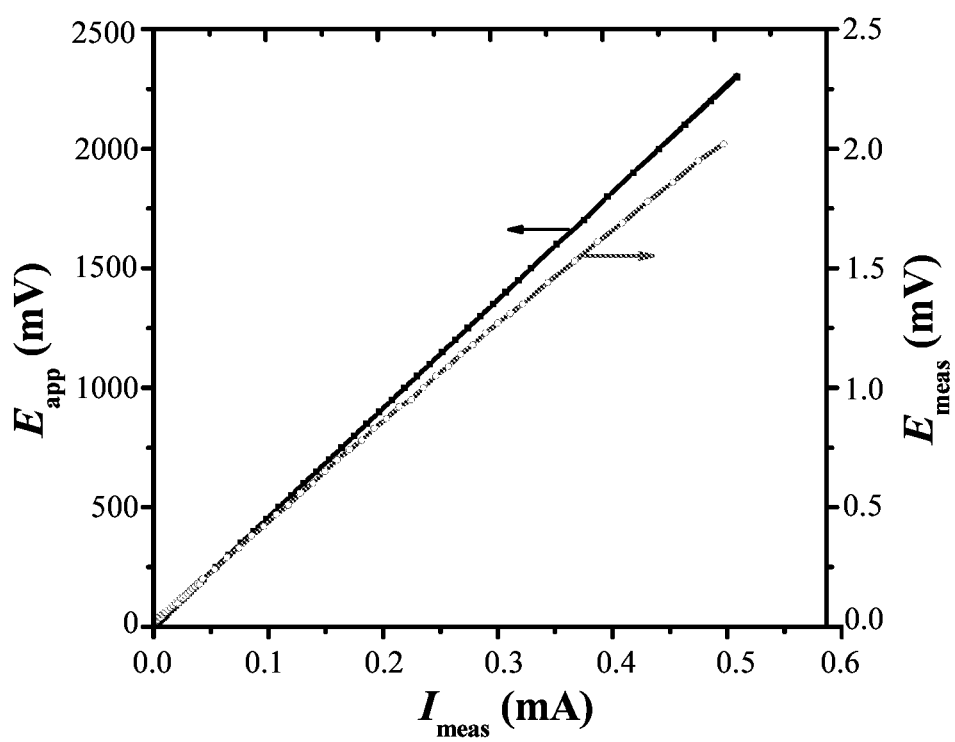
Figure 7B

Table 1

| Pipette size (μm) | Pillar diameter (μm) | Current, I (nA) | Current density (mA cm$^{-2}$) | Average deposition rate (nm s$^{-1}$) |
|---|---|---|---|---|
| 1 | 1.5 | 5 | 283 | 90 |
| 1 | 1.5 | 6 | 340 | 105 |
| 0.4 | 0.55 | 1 | 421 | 160 |
| 0.4 | 0.61 | 1.2 | 411 | 130 |
| 0.1 | 0.23 | 0.3 | 722 | 300 |
| 0.1 | 0.27 | 0.4 | 699 | 230 |

Figure 8

MENISCUS-CONFINED THREE-DIMENSIONAL ELECTRODEPOSITION

CROSS-REFERENCE TO RELATED APPLICATIONS

The present application is a National Phase Entry of PCT International Application No. PCT/IL2019/051110 which was filed on Oct. 10, 2019, which claims priority to provisional patent application Ser. No. 62/744,148, filed Oct. 11, 2018, both of which are hereby incorporated by reference in their entireties.

TECHNOLOGICAL FIELD

The invention generally concerns methods for three-dimensional (3D) electrodeposition and uses thereof.

BACKGROUND

Additive manufacturing (AM) is considered one of the promising fields in recent years, with the ability to impact, among others, the automotive, medical, energy, and aerospace industries. The main available commercialized systems for metal-based AM are based on powder bed fusion (PBF) or directed energy deposition (DED) techniques, which are based on the local melting of special powders or wires. While these techniques are well studied, they are limited in resolution, reaching top values of tens of microns, and are at times plagued with uncertainty as to the unsafety of small reactive powders, high printing costs, the use of supports, or the need for complementary heat treatments and surface finishing.

Electrodeposition is the process of depositing a substance upon an electrode by electrolysis. Electroplating is a process in which cations are reduced from a solution onto a conductive substrate by applying a potential (or current). Many materials can be deposited using electroplating, including metals, alloys, composite materials, functionally graded materials, conducting polymers, semiconductors and ceramics. Several methodologies were explored in the past utilizing the electrochemical deposition process as a mass-transport method for metal-based AM techniques.

Electroless plating is a process in which a catalytic substrate is immersed into an aqueous solution containing a soluble salt of the metal or metals being deposited and a suitable reducing agent. It is based on chemical reduction reactions and does not require an external potential. Instead, the electrons required for the metal reduction are supplied by the simultaneous oxidation of the reducing agent.

Electrochemical AM methods present clear advantages over other AM processes: (1) they have the ability to reach a sub-micron resolution; features with less than 100 nm in radius have been achieved; (2) In contrast to conventional AM, in 3D electrochemical printing the subject may be deposited without any heating, thus no heat-affected zone (HAZ)-related phenomena exist, residual stresses are minimal, no subsequent annealing or homogenization heat treatment is required, and the material is more uniform along the z-axis; (3) No support structures are used; (4) A fine surface roughness is achieved, thus no complementing surface finishing processes such as machining or electropolishing are required; (5) The chemicals and reagents are typically cheaper; (6) The equipment is cheaper, smaller, and simpler to operate; (7) No use of small reactive powders or high power lasers, therefore less safety concerns; the solutions are often safer to transport and handle; (8) Less recycling limitations, and (9) Materials that are hard to print in good quality by common AM technologies such as PBF or DED, such as Li, Mg and Al, may be easier to print, e.g., using nonaqueous media such as organic solvents, molten salts, or ionic liquids.

Madden and Hunter were the first to present AM using electrochemical deposition, in a technique called localized electrochemical deposition (LECD) [1]. The LECD method employs a micron-sized disk electrode, immersed in a solution containing the metal salt cations. The deposition is localized by positioning the electrode in close proximity to a conductive substrate. As a result, the electric field is confined to a very small region on the substrate, causing an increase in mass transport under the electrode. Several other works introduced the use of the LECD method, depositing mainly micro-pillars of copper or nickel with a resolution of a few microns, at best, high porosity, and poor surface finish [2-9].

Other electrochemical techniques make use of solution-filled hollow pipettes [10-18] or micro-channeled atomic force microscope (AFM) tips [19-21]. The latter are marketed by Exaddon AG (formerly, Cytosurge AG, Glattbrugg, Switzerland) as FluidFM® probes for certain commercial AFMs, or as part of their FluidFM® µ3Dprinter. In that technology, a special silicon AFM probe is filled with a metal salt and is immersed in an electrochemical cell. The probe is connected to a high-precision pressure regulator, which controls the solution flow rate from the probe orifice. The tip is positioned at a distance of 500 nm from the substrate, and when a sufficient cathodic potential is applied—metal ions exiting the tip are reduced locally. When the metal deposit reaches the probe, it is recognized by the deflection of the cantilever, the deposition stops, and the tip changes its location. In this manner, no calibration is required since the growth is automatically detected. Controlling the voltage, flow rate, and stage motion, several 3D copper objects were fabricated layer-by-layer, having a width of several microns, an aspect ratio of up to 75, and angles as high as 90°, with a resolution of ~1 µm. In some cases, however, poor surface finish is evident [21].

In contrast to the above, the meniscus-confined electrodeposition (MCED) method, also known as electrochemical fountain pen nanofabrication (ec-FPN), takes place while keeping the majority of the substrate out of the solution, which can in certain cases be harmful. No masks or sacrificial layers are required. The MCED process is an electrodeposition method that uses the thermodynamic stability of a liquid meniscus to directly print 3D microstructures [11, 12]. The micropipette is moved toward the conductive substrate, and an electrical potential (or current) is applied between a small wire inside the pipette and the substrate. At the appropriate distance, a liquid meniscus is formed between the substrate and the micronozzle, thus electrodeposition is initiated onto the substrate. Using the MCED method, the ability to create straight and overhang columns as well as precise electrical connections was demonstrated.

To create uniform and high-quality 3D structures, the meniscus formation and shape between the nozzle and the deposited materials must be kept. For this to happen, the distance between the micronozzle and substrate is changed at a calibrated speed that matches the metal deposition rate. The speed in which the pipette (or substrate) moved was determined by preliminary experiments, measuring the deposition rate. Since the rate is affected by the substrate and solution nature, pipette size as well as relative humidity percentage [16, 17], new calibrations have to be done before every experiment.

BACKGROUND ART

[1] J. D. Madden and I. W. Hunter, "Three-dimensional microfabrication by localized electrochemical deposition," *Journal of Microelectromechanical Systems*, vol. 5, no. 1. pp. 24-32, 1996.

[2] E. M. El-Giar et al., "Localized electrochemical deposition of copper microstructure," *Journal of the Electrochemical Society*, vol. 147, no. 2. pp. 586-591, 2000.

[3] A. Jansson et al., "High resolution 3D microstructures made by localized electrodeposition of nickel," *Journal of the Electrochemical Society*, vol. 147, no. 5. 1810-1817, 2000.

[4] S. H. Yeo and J. H. Choo, "Effects of rotor electrode in the fabrication of high aspect ratio microstructures by localized electrochemical deposition," *Journal of Micromechanics and Microengineering*, vol. 11. pp. 435-442, 2001.

[5] R. A. Said, "Localized electro-deposition (LED): The march toward process development," Nanotechnology, vol. 15. pp. S649-S659, 2004.

[6] J. C. Lin et al., "On the structure of micrometer copper features fabricated by intermittent micro-anode guided electroplating," *Electrochimica Acta*, vol. 54, no. 24. pp. 5703-5708, 2009.

[7] J. C. Lin et al., "Localized electrochemical deposition of micrometer copper columns by pulse plating," *Electrochimica Acta*, vol. 55, no. 6. pp. 1888-1894, 2010.

[8] M. M. Sundaram et al., "Mask-less electrochemical additive manufacturing: A feasibility study," *Journal of Manufacturing Science and Engineering*, vol. 137. Article 021006, 2015.

[9] F. Wang et al., "Effects of applied potential and the initial gap between electrodes on localized electrochemical deposition of micrometer copper columns," *Scientific Reports*, vol. 6. article 26270, 2016.

[10] T. Leïchlé et al., "Copper electrodeposition localized in picoliter droplets using microcantilever arrays," *Applied Physics Letters*, vol. 88, no. 25. Article 254108, 2006.

[11] A. P. Suryavanshi and M.-F. Yu, "Probe-based electrochemical fabrication of freestanding Cu nanowire array," *Applies Physics Letters*, vol. 88. Article 083103, 2006.

[12] J. Hu and M.-F. Yu, "Meniscus-confined three-dimensional electrodeposition for direct writing of wire bonds," *Science*, vol. 329, no. 5989. pp. 313-316, 2010.

[13] S. K. Seol et al., "Electrodeposition-based 3D printing of metallic microarchitectures with controlled internal structures," *Small*, vol. 11, no. 32. pp. 3896-3902, 2015.

[14] Z. Yi et al., "Vertical, capacitive microelectromechanical switches produced via direct writing of copper wires," *Microsystems & Nanoengineering*, vol. 2. Article 16010, 2016.

[15] D. Momotenko et al., "Write-read 3D patterning with a dual-channel nanopipette," *ACS Nano*, vol. 10, no. 9. pp. 8871-8878, 2016.

[16] S. Morsali et al., "Multi-physics simulation of metal printing at micro/nanoscale using meniscus-confined electrodeposition: Effect of environmental humidity," *Journal of Applies Physics*, vol. 121, no. 2. Article 024903, 2017.

[17] S. Morsali et al., "Multi-physics simulation of metal printing at micro/nanoscale using meniscus-confined electrodeposition: Effect of nozzle speed and diameter," *Journal of Applied Physics*, vol. 121, no. 21. Article 214305, 2017.

[18] A. Behroozfar et al., "Microscale 3D printing of nanotwinned copper," *Advanced Materials*, vol. 30. Article 1705107, 2018.

[19] A. Meister et al., "Nanodispenser for attoliter volume deposition using atomic force microscopy probes modified by focused-ion-beam milling," *Applied Physics Letters*, vol. 85, no. 25. pp. 6260-6262, 2004.

[20] A. Meister et al., "FluidFM: Combining atomic force microscopy and nanofluidics in a universal liquid delivery system for single cell applications and beyond," *Nano Letters*, vol. 9, no. 6. pp. 2501-2507, 2009.

[21] L. Hirt et al., "Template-free 3D microprinting of metals using a force-controlled nanopipette for layer-by-layer electrodeposition," *Advanced Materials*, vol. 28, no. 12. pp. 2311-2315, 2016.

GENERAL DESCRIPTION

The inventors of the technology disclosed herein have developed a process and a system for 3-dimentional (3D) printing/deposition of different materials, such as metals and alloys, polymers, semiconductors, ceramics, functionally graded materials (FGMs), and composites on conductive and non-conductive substrates. The 3D printing enables fabrication of sub-micron structures and is established by local electrochemical deposition using an Atomic Force Microscope (AFM) system and a hollow micropipette tip filled with an appropriate solution. In accordance with processes and systems of the invention, when the micropipette reaches the substrate, the AFM closed-loop control (e.g., in a form of a quartz crystal tuning fork, i.e. resonance control) detectes a connection between the liquid meniscus on the pipette apex and the substrate. Due to the high rigidity of the glass tip and tuning fork, combined with the tuning fork's high force sensitivity, the use of a solution-filled AFM tip in air is succsseful. By application of a proper potential, reduction of metal ions occur, only in a region confined by the meniscus.

In contrast to processes of the invention, a key requirement in the processes of the art, such as meniscus-confined electrodeposition (MCED), is to keep the shape of the liquid bridge constant, meaning that the tip/substrate motion has to be equal to the deposition rate. In all prior technologies, the tip motion is at a predefined speed and direction that are determined based on preliminary experiments of growth speed and applied current. Despite the many factors that can have an effect on the deposition rate, including the nature of the solution and substrate used, the actual orifice of the pipette, and the relative humidity, the tip motion is pre-defined (both in terms of speed and direction) and cannot be modified during operation. For example, where a tip motion is maintained when printing on a non-uniform substrate, the deposition rate from one point to another changes, resulting in a non-uniform printing.

Contrary to the art, in a process of the invention, the tip motion can change during the printing process. Owing to the closed-loop control, also known as feedback control, either the substrate or the tip is retracted away from the deposition front, in a speed equal to the printing rate, thus maintaining a constant distance between the tip and the printed feature. The MCED method in combination with the AFM closed-loop control enables full automation and in situ growth control, rendering unnecessray the need for pre-deposition experiments, and resulting in a much more uniform deposition, which is less affected by the substrate or solution properties.

Thus, in a first aspect, the invention provides a MCED method, which comprises dispensing through a deposition tool an amount of an electrolyte solution containing a reducible material onto a surface of a substrate, causing said reducible material undergo reduction, and measuring a force or a change in a force applied on the deposition tool once the reduced material is deposited, or measuring a change in the distance between the deposition tool and the substrate, such that when a change in the force or distance is measured/detected, the position of the deposition tool and/or the substrate is modified with respect to the substrate or the deposition tool, respectively, and repeating the process one or more times to afford a deposited object on the surface.

The position may be vertically or laterally modified, maintaining a liquid bridge containing a further amount of the electrolyte solution, now dispensed onto the reduced material.

This process of the invention provides means for 3D printing of high-quality, fully dense, uniform and exceptionally smooth, freestanding structures with high aspect ratios and high overhang angles that are micron-sized or nano-sized.

In some embodiments, the process is carried out while the object is exposed to air, to an inert gas or to another gas. In some embodiments, the process is carried out while the substrate is immersed completely or partially in an electrolyte bath.

In some embodiments, the substrate or object constructed are not immersed completely or partially in an electrolyte bath. In some embodiments, the process is carried out under controlled humidity conditions. In some embodiments, the process is carried out at ambient conditions of temperature and pressure.

As used herein, "meniscus-confined electrodeposition (MCED)" is an electrodeposition process that relies on an electrolyte-containing deposition tool (or electrolyte reservoir), typically in the form of a micropipette with a micron/submicron-size dispensing tip. When the micropipette approcahes vertically the vicinity of a surface of a conductive substrate, a meniscus is established between the tip and the surface. Electrical potential applied between a metal electrode suspended in the electrolyte reservoir and the surface, via the meniscus, causes reduction of the reduciable material on the surface confined by the meniscus. The process may be repeated off-surface to afford vertically oriented wires or other features.

Thus, in some embodiments, the MCED step of the process of the invention involves:
(a) providing a deposition tool in a form of an electrolyte solution reservoir comprising a reduciable form of at least one material, the tool having an end tip for dispensing an amount of the electrolyte solution,
(b) positioning the tip at a distance from the surface of the substrate,
(c) dispensing a first amount of the electrolyte solution onto the surface of the substrate, thereby forming a liquid bridge between the tip and the substrate's surface, and
(d) causing reduction of the reducible form of at least one material in the liquid bridge.

According to the process of the invention, while printing continues, the force applied on the tip of the deposition tool increases. This force can cause deformation of the tip, especially in a beam-bounce tip, and is dependent on the distance from the tip apex. Therefore, either the force applied to the tip apex or the distance from the tip apex may be detected and measured. As a result, a change in the force is detected by a force meter, and an in situ correction of the tip-to-substrate distance takes place, by either normal or lateral movement. As printing proceeds, the tip-substrate distance continues to change at the same rate, maintaining a constant meniscus shape and cross-section.

Thus, a process of the invention comprises:
(a) dispensing a first amount of an electrolyte solution onto a surface region of a substrate, the electrolyte solution comprisng a reducible form of at least one material, and contained in a deposition tool having an end tip for dispensing an amount of the electrolyte solution, thereby forming a liquid bridge between the tip and the substrate's surface,
(b) measuring or detecting a change in the distance between the tip apex and the substrate/deposition front (e.g., by measuring the actual change in the distance or by measuring a change in the applied force on the tip, the measurment may thus be by force measuremnts, as disclosed and known in the art, or by any method for measuring the distance, by e.g., optical measurements);
(c) when a change in the distance (or force) is detected, modifying at least one positional parameter associated with the tip (e.g., the tip-to-substrate distance and/or lateral position), while dispensing a further amount of the electrolyte solution onto the reduced material (off-surface), thereby forming a liquid bridge between the tip and the reduced material, and
(d) repeating steps (a)-(c) one or more times.

In some embodiments, the process comprises a step of providing a deposition tool in a form of an electrolyte solution reservoir comprising a reducible form of at least one material, the tool having an end tip for dispensing an amount of the electrolyte solution.

In some embodiments, the tip is positioned at a distnace from the surface of the substrate.

In some embodiments, once a first amount of the electrolyte solution is dispensed onto the surface of the substrate, thereby forming a liquid bridge between the tip and the substrate's surface, the reducible form of at least one material in the liquid bridge is reduced. Reduction may be achieved by any means, or as disclosed herein.

The invention further provides a meniscus-confined electrochemical deposition method, the method comprising
dispensing through a deposition tool an amount of an electrolyte solution containing a reducible material onto a surface of a substrate,
causing said reducible material undergo reduction,
measuring a change in at least one parameter selected from a distance between the deposition tool and the surface and a change in a force applied on the deposition tool once the material is deposited, such that when a change in the distance or force is measured/detected, the position of the deposition tool and/or the substrate is modified with respect to the substrate or the deposition tool, and
repeating the method one or more times to afford a deposited object on the surface.

In some embodiments of any aspect of the invention, the process comprises:
(a) providing a deposition tool in a form of an electrolyte solution reservoir comprising a reducible form of at least one material, the tool having an end tip for dispensing an amount of the electrolyte solution, (b) positioning the tip at a distnace from the surface of the substrate,
(c) dispensing a first amount of the electrolyte solution onto the surface of the substrate, thereby forming a liquid bridge between the tip and the substrate's surface,
(d) causing reduction of the reducible form of at least one material in the liquid bridge,
(e) measuring or detecting a change in the distance between the tip apex and the substrate/deposition front (e.g., by measuring the actual change in the distance or by measuring a change in the applied force on the tip, the measurment may thus be by force measuremnts, as disclosed and known in the art, or by any method for measuring the distance, by e.g., optical measurements);
(f) when a change in the distance (or force) is detected, modifying at least one positional parameter associated with the tip (e.g., the tip-to-substrate distance and/or lateral position), while dispensing a further amount of the electrolyte solution onto the reduced material (off-surface), thereby forming a liquid bridge between the tip and the reduced material, and
(g) repeating steps (d)-(f) one or more times.

The deposition tool comprises the electrolyte reservoir that is associated with a dispensing tip in the form of a micropipette with a microscopic or nanoscopic opening, said opening being optionally between 40 nm and 5 μm. The deposition tool may comprise a plurality of reservoirs, each reservoir having different or independent dispensing tips, each tip may be of the same size opening, same shape, same material, or may be different in one or more properties, or may be different in one or more of size, shape and material. Alternatively, the deposition tool may comprise a plurality of reservoirs, some or all of which may be connected to a single dispensing end, e.g., to permit continuous dispensing of multiple same or different electrolyte solutions, e.g., to form heterostructures. The deposition tool may also comprise a pump connected to the tip's reservoir, e.g., to control the pressure inside the tip, which in turn can affect the meniscus size. Moreover, the pump can be used to replace the solution inside the tip as well as for tip maintenance.

As both the structure of the deposited feature and the resolution are mostly dependent on the tip shape and size, tips with smaller inner diameters may be utilized to achieve features with smaller cross-sections, while tips with larger inner diameters may be used for larger cross-sections.

In some embodiments, the micropipette is an AFM tip made of a hollow glass tube, e.g. of a material such as borosilicate, aluminosilicate, or quartz, having an inner diameter of between 40 nm and 5 μm. The liquid bridge formed by dispensing an electrolyte solution from the micropipette tip onto the surface has a diameter that substantially equals the inner diameter of the tip and a height defined by the distance between the substrate's surface or a site of further deposition (in a sequential off-substrate deposition step) and the tip. The distance between the tip and the surface or the height of the liquid bridge is between, e.g., 10 nm and 7 μm. In some embodiments, the liquid bridge has a volume of between 150 fL and 1.5 zL.

To reduce the reducible form, e.g., an ionic form of the at least one material in the electrolyte solution, current is allowed to flow between an electrode present in the electrolyte reservoir and the substrate's surface or the site of deposition (in a sequential deposition step). Once the first feature or element is formed on the substrate's surface, or after each deposition step, a change in the distance between the tip apex and the deposition front, or a change in the force, is measured (either by force control or by any other control). The distance/force may be detected by any sensor known in the field. For example, when measuring a change in the force on the tip, the change in the force may be measured by a force meter such as a tuning fork connected to the micropipette, and optionally operated in a tapping mode. The tapping mode can be either normal (perpendicular) or lateral (horizontal) tapping. The force can be measured by a laser bouncing from the tip cantilever onto a sensor. The laser will thus deflect to a different position on a sensor when the cantilever deflection changes as a result of the applied force.

Alternatively, light (either white or laser) is allowed to pass through a fiber in the pipette, e.g., employing the laser triangulation method. The distance between the tip and the substrate may be measured according to changes in the reflected light intensity, wavelength, angle, etc. Closed-loop control systems may also be based on chromatic confocal distance sensors. A distance change of several nanometers can be detected with these techniques.

When a change in the distance/force is detected, the position of either the tip or substrate is changed by changing at least one parameter associated with the position of the tip (or substrate) relative to its position at the time of measurement. The positional parameter may be the tip-to-substrate distance and/or lateral position. While the position of the tip or substrate is modified, a further amount of the electrolyte solution is dispensed onto the reduced material, thereby forming a liquid bridge between the tip and the reduced material. The new liquid bridge is thereafter reduced, and the process is permitted to continue one or more times.

The repositioning of the tip or the substrate may be to a position vertical or horizontal to the preceding point of deposition. Thus, the tip or substrate may be retracted or moved laterally, vertically, or at an angle with respect to the first deposition site on the substrate's surface (or relative to any other point or position on the substrate or a pattern formed).

In an exemplary setup for a process of the invention, the setup comprises a tip (pipette), e.g., an AFM tip, filled with an ionic solution (such as a copper salt, e.g., $CuSO_4$), a polished metal, e.g., copper foil which acts as the working electrode, and a platinum wire inserted to the back of the tip acting as the counter electrode. The printing begins when the tip approaches the substrate while current is applied. When a connection is recognized and a liquid meniscus is formed, the tip is stopped by the closed-loop control. At this point, a closed electrical circuit is established, and reduction of the metal ions is initiated, confined to the meniscus area. While deposition continues in the vertical direction, the force applied on the tip changes. As a result of a change in the tuning fork, signal is recognized, and an in situ correction of the tip-substrate distance takes place by the closed-loop control. As deposition continues, the tip-to-substrate distance changes at the same rate, maintaining a constant meniscus shape and a uniform cross-section.

The electroplating processes according to the invention typically involve electrodeposition steps, hence they may be carried on conductive surfaces utilizing conductive materials. The substrate for printing may be of any conductive material such as pure metals, alloys, conductive polymers, semiconductors, or ceramics coated (partially or completely) with a conducting thin layer. Examples include, but are not limited to (1) Metals: any metal from Groups 1 through 15 of The Periodic Table of The Elements, excluding Hg, and their alloys; (2) Polymers: poly(pyrrole)s, polyanilines, poly (acetylene, poly(p-phenylene vinylene), poly(thiophene)s, poly(3,4-ethylenedioxythiophene), poly(p-phenylene sulfide); (3) Semiconductors: pure Si or Ge, binary compounds of elements from Groups 12 (IIB) and 16 (VIA) of The Periodic Table (e.g., CdS, ZnS), binary compounds of elements from Groups 13 (IIIA) and 15 (VA) (e.g. GaAs), and ternaries such as $CuInSe_2$.

The at least one material selected for 3D printing in accordance with the invention may be selected amongst metals, alloys, conducting polymers, semiconductor materials, ceramic suspensions, and combinations thereof.

For achieving effective deposition of a metal, the at least one material is presented in an ionic form, reducible under current to the metal. The reducible form may be an ionic form or a metal complex form. The metal is typically selected from the metallic elements of Groups IIIB, IVB, VB, VIB, VIIB, VIIIB, IB, IIB, IIIA, IVA, VA, IA and IIA of The Periodic Table of The Elements. In some embodiments, the metallic element is selected from Cu, Zn, Ni, Fe, Co, Cd, Y, Zr, Nb, Mo, Tc, Ru, Rh, Pd, Ag, La, Hf, Ta, W, Re, Os, Ir, Pt, Au, Sc, Ti, V, Cr, Mn, Ca, Sr, and Li, Mg and Al (which are fairly hard to deposit in good quality by PBF or DED). In some embodiments, the deposited element is selected from Ga, In, Tl, Si, Ge, Sn, Pb, Sb, Bi, As, Se, and Te.

The electrolyte solution may comprise an ionic form of the metal or a complex form thereof. The ionic form may comprise the metal in a charged form with a suitable counter ion (one or more), wherein the ionic form is soluble in the medium of the electrolyte solution.

In some embodiments, the metal precursor is selected from:

Metal precursors as cations, wherein "M" represents a metal atom as disclosed herein, including:

chlorides, e.g., selected from $MCl$, $MCl_2$, $MCl_3$, $MCl_4$, $MCl_5$, and $MCl_6$;

chloride hydrates, e.g., selected from $MCl \cdot xH_2O$, $MCl_2 \cdot xH_2O$, $MCl_3 \cdot xH_2O$, $MCl_4 \cdot xH_2O$, $MCl_5 \cdot xH_2O$, and $MCl_6 \cdot xH_2O$, wherein x varies based on the nature of M;

hypochlorites/chlorites/chlorates/cerchlorates (abbreviated $ClO_n^-$, n=1, 2, 3, 4), e.g., selected from $MClO_n$, $M(ClO_n)_2$, $M(ClO_n)_3$, $M(ClO_n)_4$, $M(ClO_n)_5$, and $M(ClO_n)_6$;

hypochlorite/chlorite/chlorate/perchlorate hydrates, e.g., selected from $MClO_n \cdot xH_2O$, $M(ClO_n)_2 \cdot xH_2O$, $M(ClO_n)_3 \cdot xH_2O$, $M(ClO_n)_4 \cdot xH_2O$, $M(ClO_n)_5 \cdot xH_2O$, and $M(ClO_n)_6 \cdot xH_2O$, wherein x varies based on the nature of M, and n=1, 2, 3, 4;

carbonates, e.g., selected from $M_2CO_3$, $MCO_3$, $M_2(CO_3)_3$, $M(CO_3)_2$, $M_2(CO_3)_2$, $M(CO_3)_3$, $M_3(CO_3)_4$, $M(CO_3)_5$, $M_2(CO_3)_7$;

carbonate hydrates, e.g., selected from $M_2CO_3 \cdot xH_2O$, $MCO_3 \cdot xH_2O$, $M_2(CO_3)_3 \cdot xH_2O$, $M(CO_3)_2 \cdot xH_2O$, $M_2(CO_3)_2 \cdot xH_2O$, $M(CO_3)_3 \cdot xH_2O$, $M_3(CO_3)_4 \cdot xH_2O$, $M(CO_3)_5 \cdot xH_2O$, and $M_2(CO_3)_7 \cdot xH_2O$, wherein x varies based on the nature of M;

carboxylates (abbreviated $RCO_2^-$, and including acetates), e.g., selected from $MRCO_2$, $M(RCO_2)_2$, $M(RCO_2)_3$, $M(RCO_2)_4$, $M(RCO_2)_5$, and $M(RCO_2)_6$;

carboxylate hydrates (abbreviated $RCO_2^-$), e.g., selected from $MRCO_2 \cdot xH_2O$, $M(RCO_2)_2 \cdot xH_2O$, $M(RCO_2)_3 \cdot xH_2O$, $M(RCO_2)_4 \cdot xH_2O$, $M(RCO_2)_5 \cdot xH_2O$, and $M(RCO_2)_6 \cdot xH_2O$, wherein x varies based on the nature of M;

carboxylate (the group $RCOO^-$, R is aliphatic chain, which may be saturated or unsaturated), e.g., selected from $CH_3CH=CHCOOM$ (metal crotonate), $CH_3(CH_2)_3CH=CH(CH_2)_7COOM$ (metal myristoleate), $CH_3(CH_2)_5CH=CH(CH_2)_7COOM$ (metal palmitoleate), $CH_3(CH_2)_8CH=CH(CH_2)_4COOM$ (metal sapienate), $CH_3(CH_2)_7CH=CH(CH_2)_7COOM$ (metal oleate), $CH_3(CH_2)_7CH=CH(CH_2)_7COOM$ (metal elaidate), $CH_3(CH_2)_5CH=CH(CH_2)_9COOM$ (metal vaccinate), $CH_3(CH_2)_7CH=CH(CH_2)_{11}COOM$ (metal erucate), $C_{17}H_{35}COOM$ (metal stearate);

oxides, e.g., selected from $M_2O$, $MO$, $M_2O_3$, $MO_2$, $M_2O_2$, $MO_3$, $M_3O_4$, $MO_5$, and $M_2O_7$;

acetates, e.g., (the group $CH_3COO^-$, abbreviated $AcO^-$) selected from $AcOM$, $AcO_2M$, $AcO_3M$, and $AcO_4M$;

acetate hydrates, (the group $CH_3COO^-$, abbreviated $AcO^-$), e.g., selected from $AcOM \cdot xH_2O$, $AcO_2M \cdot xH_2O$, $AcO_3M \cdot xH_2O$, and $AcO_4M \cdot xH_2O$, wherein x varies based on the nature of M;

acetylacetonates (the group $C_2H_7CO_2^-$, abbreviated $AcAc^-$), e.g., selected from $AcAcM$, $AcAc_2M$, $AcAc_3M$, and $AcAc_4M$;

acetylacetonate hydrates (the group $C_2H_7CO_2^-$, abbreviated $AcAc^-$), e.g., selected from $AcAcM \cdot xH_2O$, $AcAc_2M \cdot xH_2O$, $AcAc_3M \cdot xH_2O$, and $AcAc_4M \cdot xH_2O$, wherein x varies based on the nature of M;

nitrates, e.g., selected from $MNO_3$, $M(NO_3)_2$, $M(NO_3)_3$, $M(NO_3)_4$, $M(NO_3)_5$, and $M(NO_3)_6$;

nitrate hydrates, e.g., selected from $MNO_3 \cdot xH_2O$, $M(NO_3)_2 \cdot xH_2O$, $M(NO_3)_3 \cdot xH_2O$, $M(NO_3)_4 \cdot xH_2O$, $M(NO_3)_5 \cdot xH_2O$, and $M(NO_3)_6 \cdot xH_2O$, wherein x varies based on the nature of M;

nitrites, e.g., selected from $MNO_2$, $M(NO_2)_2$, $M(NO_2)_3$, $M(NO_2)_4$, $M(NO_2)_5$, and $M(NO_2)_6$;

nitrite hydrates, e.g., selected from $MNO_2 \cdot xH_2O$, $M(NO_2)_2 \cdot xH_2O$, $M(NO_2)_3 \cdot xH_2O$, $M(NO_2)_4 \cdot xH_2O$, $M(NO_2)_5 \cdot xH_2O$, and $M(NO_2)_6 \cdot xH_2O$, wherein x varies based on the nature of M;

cyanates, e.g., selected from $MCN$, $M(CN)_2$, $M(CN)_3$, $M(CN)_4$, $M(CN)_5$, $M(CN)_6$;

cyanate hydrates, e.g., selected from $MCN \cdot xH_2O$, $M(CN)_2 \cdot xH_2O$, $M(CN)_3 \cdot xH_2O$, $M(CN)_4 \cdot xH_2O$, $M(CN)_5 \cdot xH_2O$, and $M(CN)_6 \cdot xH_2O$, wherein x varies based on the nature of M;

sulfides, e.g., selected from $M_2S$, $MS$, $M_2S_3$, $MS_2$, $M_2S_2$, $MS_3$, $M_3S_4$, $MS_5$, and $M_2S_7$;

sulfide hydrates, e.g., selected from $M_2S \cdot xH_2O$, $MS \cdot xH_2O$, $M_2S_3 \cdot xH_2O$, $MS_2 \cdot xH_2O$, $M_2S_2 \cdot xH_2O$, $MS_3 \cdot xH_2O$, $M_3S_4 \cdot xH_2O$, $MS_5 \cdot xH_2O$, and $M_2S_7 \cdot xH_2O$, wherein x varies based on the nature of M;

sulfites, e.g., selected from $M_2SO_3$, $MSO_3$, $M_2(SO_3)_3$, $M(SO_3)_2$, $M_2(SO_3)_2$, $M(SO_3)_3$, $M_3(SO_3)_4$, $M(SO_3)_5$, and $M_{29}(SO_3)_7$;

sulfite hydrates selected from $M_2SO_3 \cdot xH_2O$, $MSO_3 \cdot xH_2O$, $M_2(SO_3)_3 \cdot xH_2O$, $M(SO_3)_2 \cdot xH_2O$, $M_2(SO_3)_2 \cdot xH_2O$, $M(SO_3)_3 \cdot xH_2O$, $M_3(SO_3)_4 \cdot xH_2O$, $M(SO_3)_5 \cdot xH_2O$, and $M_2(SO_3)_7 \cdot xH_2O$, wherein x varies based on the nature of M;

hyposulfites, e.g., selected from $M_2SO_2$, $MSO_2$, $M_2(SO_2)_3$, $M(SO_2)_2$, $M_2(SO_2)_2$, $M(SO_2)_3$, $M_3(SO_2)_4$, $M(SO_2)_5$, and $M_2(SO_2)_7$;

hyposulfite hydrates, e.g., selected from $M_2SO_2 \cdot xH_2O$, $MSO_2 \cdot xH_2O$, $M_2(SO_2)_3 \cdot xH_2O$, $M(SO_2)_2 \cdot xH_2O$, $M_2(SO_2)_2 \cdot xH_2O$, $M(SO_2)_3 \cdot xH_2O$, $M_3(SO_2)_4 \cdot xH_2O$, $M(SO_2)_5 \cdot xH_2O$, and $M_2(SO_2)_7 \cdot xH_2O$, wherein x varies based on the nature of M;

sulfates, e.g., selected from $M_2SO_3$, $MSO_3$, $M_2(SO_3)_3$, $M(SO_3)_2$, $M_2(SO_3)_2$, $M(SO_3)_3$, $M_3(SO_3)_4$, $M(SO_3)_5$, and $M_2(SO_3)_7$;

sulfate hydrates, e.g., selected from $M_2SO_3 \cdot xH_2O$, $MSO_3 \cdot xH_2O$, $M_2(SO_3)_3 \cdot xH_2O$, $M(SO_3)_2 \cdot xH_2O$, $M_2(SO_3)_2 \cdot xH_2O$, $M(SO_3)_3 \cdot xH_2O$, $M_3(SO_3)_4 \cdot xH_2O$, $M(SO_3)_5 \cdot xH_2O$, and $M_2(SO_3)_7 \cdot xH_2O$, wherein x varies based on the nature of M;

thiosulfates, e.g., selected from $M_2S_2O_3$, $MS_2O_3$, $M_2(S_2O_3)_3$, $M(S_2O_3)_2$, $M_2(S_2O_3)_2$, $M(S_2O_3)_3$, $M_3(S_2O_3)_4$, $M(S_2O_3)_5$, and $M_2(S_2O_3)_7$;

thiosulfate hydrates, e.g., selected from $M_2S_2O_3 \cdot xH_2O$, $MS_2O_3 \cdot xH_2O$, $M_2(S_2O_3)_3 \cdot xH_2O$, $M(S_2O_3)_2 \cdot xH_2O$, $M_2(S_2O_3)_2 \cdot xH_2O$, $M(S_2O_3)_3 \cdot xH_2O$, $M_3(S_2O_3)_4 \cdot xH_2O$, $M(S_2O_3)_5 \cdot xH_2O$, and $M_2(S_2O_3)_7 \cdot xH_2O$, wherein x varies based on the nature of M;

dithionites, e.g., selected from $M_2S_2O_4$, $MS_2O_4$, $M_2(S_2O_4)_3$, $M(S_2O_4)_2$, $M_2(S_2O_4)_2$, $M(S_2O_4)_3$, $M_3(S_2O_4)_4$, $M(S_2O_4)_5$, and $M_2(S_2O_4)_7$;

dithionite hydrates, e.g., selected from $M_2S_2O_4 \cdot xH_2O$, $MS_2O_4 \cdot xH_2O$, $M_2(S_2O_4)_3 \cdot xH_2O$, $M(S_2O_4)_2 \cdot xH_2O$, $M_2(S_2O_4)_2 \cdot xH_2O$, $M(S_2O_4)_3 \cdot xH_2O$, $M_3(S_2O_4)_4 \cdot xH_2O$, $M(S_2O_4)_5 \cdot xH_2O$, and $M_2(S_2O_4)_7 \cdot xH_2O$, wherein x varies based on the nature of M;

phosphates, e.g., selected from $M_3PO_4$, $M_3(PO_4)_2$, $MPO_4$, and $M_4(PO_4)_3$;

phosphate hydrates, e.g., selected from $M_3PO_4 \cdot xH_2O$, $M_3(PO_4)_2 \cdot xH_2O$, $MPO_4 \cdot xH_2O$, and $M_4(PO_4)_3 \cdot xH_2O$, wherein x varies based on the nature of M;

Metal alkyls;

Metal alkoxides;

Metal amines;

Metal phosphines;

Metal thiolates;

Combined cation-anion single source precursors, i.e., molecules that include both cation and anion atoms, for example of the formula $M(E_2CNR_2)_2$ (M=a metal, E=for example, a chalcogenide, R=alkyl, amine alkyl, silyl alkyl, phosphoryl alkyl, phosphyl alkyl).

Typically, the solution is an aqueous solution comprising water, the reducible form (e.g., ionic form) of the at least one material, and an additive such as an organic compound or an acid. This additive may be a wetting agent (e.g., sodium lauryl sulfate), a brightener (e.g., vanillin, sodium citrate, sulfonic acid, or 1,4-Bis(2-hydroxyethoxy)-2- butyne), a residual stress reducer (e.g., sulfamates or saccharin), an inhibitor of hydrogen evolution, a macro/micro leveling agent (e.g., gelatin), an agent to increase the current efficiency (e.g. sulfates) and deposition rate (e.g., sulfamates), an agent to increase the throwing power (e.g., sulfamates), control the crystal texture and grain size of the deposited material (e.g., saccharin), an agent to increase hardness (e.g., saccharin), an agent to increase the corrosion resistance (e.g., sodium benzoate, uric acid, thiazole), or an agent to prevent passivation of the substrate's surface (e.g., chloride ions), and others.

Alternatively, the medium is a non-aqueous medium such as conventional organic solvents, molten salts, or ionic liquids (i.e., salts having melting points below 100° C.). Examples include etheric solvents, aromatic hydrocarbons, dimethylsulfone, haloaluminate molten salt systems, metal-fluoride melts, metal bromides dissolved in aromatic solvents, metal-organic compounds dissolved in toluene, etc.

For 3D electrodeposition of conducting polymers, growth media such as molecular solvent/electrolyte systems or ionic liquids can be used. Conducting polymers such as polypyrrole (PPy), poly(3,4-ethyl-enedioxythiophene) (PEDOT), and polythiophene (PTh) have already been electroplated successfully by conventional processes, such as direct anodic electrodeposition. Thus, they could be 3D printed by the MCED technique.

Moreover, the 3D printing process, according to the invention, may involve an electroless (autocatalytic) deposition step, consequently it may be carried without a supply of any external electric power, and on both conductive and non-conductive surfaces. In case of non-conductive substrates, the area at which 3D electroless deposition is required has to be activated by other means. In such embodiments, the process of the invention may comprise of at least two steps: (1) local activation treatment of the substrate by a technique such as laser induced forward transfer (LIFT) printing of a "seed" layer of a certain material (say, metal or alloy that can form strong bonds with both the substrate and the printed material), which catalyzes the reduction reaction and ensures good adhesion to the substrate; and (2) 3D meniscus confined electroless deposition process on the locally pretreated substrate's surface.

Processes of the invention may be used for fabricating nanowires, high-density interconnects for integrated circuits, direct writing of sub-micron scale circuitry for advanced display technologies and advanced electronic packaging, conductive bridges and precise electrical connections, thermocouples, interposers, high-frequency terahertz antennas, probe arrays, and precision sensors. The processes may also be used in the fabrication of micro- or nano-electromechanical systems (MEMS and NEMS, respectively), batteries and fuel cells.

Additionally, processes of the invention may be used to repair or modify existing micro-sized or nano-sized features. They are perfectly situated to tackle the issue of yield enhancement by local printing of sub-micron to few microns, missing conductive tracks.

In accordance with the invention, a system is also provided for fabricating features or elements as described herein or for carrying processes of the invention. A system according to the invention may be constructed around either a commercialized or a homemade AFM, and may comprise an environmental chamber, a sensitive force meter, a deposition tool as defined and structured herein, and a visualization system, wherein the deposition tool is functionally associated with the force meter, e.g., tuning fork, to provide high sensitivity for determining, detecting or measuring a change in the distance between a liquid dispensing tip on the deposition tool or the force imposed on the tip, as described herein. In order to achieve successful printing, the system of the invention is engineered to be highly sensitive to forces applied on the tip, and to have fast response and a rigid structure, so that the tip cantilever does not deflect due to the weight of the solution in the electrolyte reservoir or in the tip/pipette itself or the surface tension force (snap on/off). To detect small changes in the forces applied on the deposition tip, the tip is connected to a force sensor such as a tuning fork. In some embodiments, the force sensor is a deflection sensor, such as an optical deflection sensor or a deflection sensor based on the piezoresistive or piezoelectric effect (the rigidity of the tip). The system may optionally comprise a vibration isolation table/plate.

A system is further provided that comprises a liquid deposition tool, a closed-loop feedback control, an environmental chamber, a source meter, and optionally a visualization system, wherein the closed-loop feedback control comprises a force/distance meter functionally associated with the deposition tool for measuring a change in the distance between the deposition tool and the surface, or a change in a force applied on the deposition tool.

Any system according to the invention may be equipped with a deposition tool as defined, having a dispensing tip in the form of a micropipette. The micropipette may be a hollow tube made from borosilicate or quartz, as disclosed.

The system may additionally be equiped with a control loop. While systems of the art employ beam bounce control, in which a laser bounces back from the tip cantilever to a sensor, detecting a change in the cantilever deflection due to forces applied on the tip, the system of the invention utilizes a quartz tuning fork (QTF) that is connected to the tip. The QTF allows the sensing of very small forces applied on the tip by recognizing a change in its resonance.

The invention further provides a 3D printing system being comprised of a closed-loop feedback control, a deposition tool, and means for modifying the position of the deposition tool with respect of a substrate or a feature on the surface of the substrate. The closed-loop feedback control provides means for detecting a change in a force imposed on the deposition tool by either the substrate or a feature formed on the substrate, or a change in the distance of the deposition tool from the substrate or from a feature formed on the substrate, such that upon detecting a change in the force or distance, the position of the deposition tool is modified vertically or laterally with respect to the substrate or the feature formed on the substrate.

Exemplary aspects and embodiments of the invention thus include:

A meniscus-confined electrochemical deposition method, the method comprising
  dispensing through a deposition tool an amount of an electrolyte solution containing a reducible material onto a surface of a substrate,
  causing said reducible material undergo reduction,
  measuring a change in at least one parameter selected from a distance between the deposition tool and the surface and a change in a force applied on the deposition tool once the material is deposited, such that when a change in the distance or force is measured/detected, the position of the deposition tool and/or the substrate is modified with respect to the substrate or the deposition tool, and
  repeating the method one or more times to afford a deposited object on the surface.

In some embodiments, in a method of the invention, the method is carried out under air, an inert gas, or another gas.

In some embodiments, in a method of the invention, the method is carried out while the substrate is immersed completely or partially in an electrolyte bath.

In some embodiments, in a method of the invention, the method comprisng
  (a) providing a deposition tool in a form of an electrolyte solution reservoir comprising a reduciable form of at least one material, the deposition tool having an end tip for dispensing an amount of the electrolyte solution,
  (b) positioning the tip at a distance from the surface of the substrate,
  (c) dispensing a first amount of the electrolyte solution onto the surface of the substrate, thereby forming a liquid bridge between the tip and the substrate's surface, and
  (d) causing reduction of the reducible form of the at least one material in the liquid bridge.

In some embodiments, in a method of the invention, the method further comprising measuring a change in the force applied on the tip, and modifying the tip-to-substrate distance by normal or lateral movement.

In some embodiments, in a method of the invention, the method comprising
  (a) providing a deposition tool in a form of an electrolyte solution reservoir comprising a reducible form of at least one material, the deposition tool having an end tip for dispensing an amount of the electrolyte solution,
  (b) positioning the tip at a distnace from the surface of the substrate,
  (c) dispensing a first amount of the electrolyte solution onto the surface of the substrate, thereby forming a liquid bridge between the tip and the substrate's surface,
  (d) causing reduction of the reducible form of the at least one material in the liquid bridge,
  (e) measuring or detecting a change in the distance between the tip apex and the substrate/deposition front,
  (f) once a change in the distance is detected, modifying at least one positional parameter associated with the tip, while dispensing a further amount of the electrolyte solution onto the reduced material, thereby forming a liquid bridge between the tip and the reduced material, and
  (g) repeating steps (d)-(f) one or more times.

In some embodiments, in a method of the invention, the at least one positional parameter associated with the tip is a tip-to-substrate distance and/or the tip lateral position.

In some embodiments, in a method of the invention, the change in distance is determined by measuring the actual change in the distance or by measuring a change in the applied force on the tip.

In some embodiments, in a method of the invention, the deposition tool has a dispensing tip in the form of a micropipette with a microscopic or nanoscopic opening, said opening being optionally between 40 nm and 5 μm.

In some embodiments, in a method of the invention, the deposition tool comprises a plurality of reservoirs, each reservoir having different or independent dispensing tips.

In some embodiments, in a method of the invention, the deposition tool comprises a plurality of reservoirs, at least a portion or all of said plurality of reservoirs being connected to a single dispensing end.

In some embodiments, in a method of the invention, the micropipette is an AFM tip.

In some embodiments, in a method of the invention, the micropipette is in a form of a hollow glass tube.

In some embodiments, in a method of the invention, the glass tube is of a material selected from borosilicate, aluminosilicate, or quartz.

In some embodiments, in a method of the invention, the glass tube having an inner diameter of between 40 nm and 5 μm.

In some embodiments, in a method of the invention, the substrate's surface is of a conductive material or non-conductive material.

In some embodiments, in a method of the invention, the conductive material is selected from metals, metal alloys, conductive polymers, semiconductors, and ceramics coatings.

In some embodiments, in a method of the invention, the object is of a material selected from metals, alloys, conducting polymers, semiconductor materials, ceramic materials and combinations thereof.

In some embodiments, in a method of the invention, the reducible material is of a materail selected from metals, alloys, conducting polymers, semiconductor materials, ceramic materials, and combinations thereof.

In some embodiments, in a method of the invention, the reducible material is in a form of a metal ion or a metal complex.

In some embodiments, in a method of the invention, the reducible material is an ion of a metal selected from Cu, Zn, Ni, Fe, Co, Cd, Y, Zr, Nb, Mo, Tc, Ru, Rh, Pd, Ag, La, Hf, Ta, W, Re, Os, Ir, Pt, Au, Sc, Ti, V, Cr, Mn, Ca, Sr, Li, Mg and Al.

In some embodiments, in a method of the invention, the metal is selected from Ga, In, Tl, Si, Ge, Sn, Pb, Sb, Bi, As, Se, and Te.

In some embodiments, in a method of the invention, the electrolyte solution is an aqueous solution comprising water, and the reducible material is an ionic form of the material.

In some embodiments, in a method of the invention, the electrolyte solution is a non-aqueous medium comprising an organic solvent, a molten salt, or an ionic liquid.

In some embodiments, in a method of the invention, the method is for fabricating nanowires, high-density interconnects, sub-micron scale circuitry, conductive bridges and precise electrical connections, thermocouples, interposers, high-frequency terahertz antennas, probe arrays and precision sensors.

In some embodiments, in a method of the invention, the method is for fabricating micro- or nano-electromechanical systems, batteries and fuel cells.

In some embodiments, in a method of the invention, the method is for repairing or modifying micro-sized or nano-sized features.

Also provided is a printing system comprising a liquid deposition tool, a closed-loop feedback control, an environmental chamber, a source meter, and optionally a visualization system, wherein the closed-loop feedback control comprises a force/distance meter functionally associated with the deposition tool for measuring a change in the distance between the deposition tool and the surface or a change in a force applied on the deposition tool.

In some embodiments, in a system of the invention, the deposition tool is in a form of an electrolyte solution reservoir having an end tip for dispensing an amount of the electrolyte solution.

In some embodiments, in a system of the invention, the force/distance meter is capable of measuring a change in the force applied on the tip.

In some embodiments, in a system of the invention, the force/distance meter is capable of measuring a change in the distance between the tip apex and the substrate or a deposition front.

In some embodiments, in a system of the invention, the deposition tool comprises a plurality of reservoirs, each reservoir having different or independent dispensing tips.

In some embodiments, in a system of the invention, the deposition tool comprises a plurality of reservoirs, at least a portion or all of said plurality of reservoirs being connected to a single dispensing end.

In some embodiments, in a system of the invention, the tip is in a form of a micropipette.

In some embodiments, in a system of the invention, the micropipette is an AFM tip.

In some embodiments, in a system of the invention, the micropipette is in a form of a hollow glass tube.

In some embodiments, in a system of the invention, the glass tube is of a material selected from borosilicate, aluminosilicate, and quartz.

In some embodiments, in a system of the invention, the glass tube having an inner diameter of between 40 nm and 5 μm.

In some embodiments, in a system of the invention, the system is an AFM.

In some embodiments, in a system of the invention, the system is for carrying out a process accoridng to the invention.

In some embodiments, in a system of the invention, the system is for carrying out a meniscus-confined electrochemical deposition method.

In some embodiments, in a system of the invention, the method comprises
  dispensing through a deposition tool an amount of an electrolyte solution containing a reducible material onto a surface of a substrate,
  causing said reducible material undergo reduction,
  measuring a change in the distance between the deposition tool and the surface or a change in a force applied on the deposition tool once the material is deposited, such that when a change in the distance or force is measured/detected, the position of the deposition tool and/or the substrate is modified with respect to the substrate or the deposition tool, respectively, and
  repeating the method one or more times to afford a deposited object on the surface.

In some embodiments, in a system of the invention, the force sensor is a tuning fork.

In some embodiments, in a system of the invention, the force sensor is a deflection sensor.

In some embodiments, in a system of the invention, the deflection sensor is an optical deflection sensor or a piezoresistive or piezoelectric deflection sensor.

Also provided is a 3D printing system, the system comprising a closed-loop feedback control, a deposition tool, and means for modifying the position of the deposition tool with respect to a substrate or a feature on the surface of the substrate, the closed-loop feedback control comprising means for detecting a change in a force imposed on the deposition tool by the substrate or a feature formed on the substrate, or a change in the distance of the deposition tool from the substrate or from a feature formed on the substrate, such that upon detecting a change in the force or distance, the position of the deposition tool is modified vertically or laterally with respect to the substrate or the feature formed on the substrate.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A shows three types of hollow AFM tips: [1] Illustration of a beam-bounce tip glued to a magnetic holder. A gold coating is applied by chemical vapor deposition (CVD) from the cantilever nearly all the way to the tip end. A platinum wire is inserted through the backside. [2] Illustration of a lateral tuning fork (LTF) in which the pipette is attached to the tuning fork on its side. [3] An image of a normal tuning fork (NTF) in which the pipette is attached to the bottom cantilever of the tuning fork. FIG. 2B shows a scanning electron microscope (SEM) image of a 1.5 µm in diameter copper pillar with an illustration of the tip apex and the liquid meniscus connected to it. The electrochemical setup contains the AFM tip, filled with the ionic solution ($CuSO_4$), a polished copper foil that acts as the working electrode, and a platinum wire inserted to the back of the tip acting as the counter electrode. Owing to the fact that the maximum currents applied in these experiments were around a few nano amperes (nA), the polarization of the platinum wire could be considered negligible, and it was referred to as a pseudo-reference electrode. The printing begins when the tip approaches the substrate while current is applied. When a connection is recognized and a liquid meniscus is formed, the tip is stopped by the AFM closed-loop control. At this point, a closed electrical circuit is established (as evident from a sharp change in potential/current), and reduction of the metal ions is initiated, confined to the meniscus area. While deposition continues in the vertical direction, the force applied on the tip changes. As a result of a change in the tuning fork, signal is recognized, and an in situ correction of tip-substrate distance takes place by the AFM closed-loop control. As 3D printing continues, the tip-to-substrate distance changes at the same rate, maintaining a constant meniscus shape and a uniform cross-section, as shown in FIG. 2B. The liquid bridge (i.e., meniscus) formed by dispensing an electrolyte solution from the micropipette tip onto the surface has a diameter that substantially equals the inner diameter of the tip, and a height defined by the distance between the substrate surface or a site of further deposition (in a sequential off-substrate deposition step) and the tip. The structure of the deposited feature as well as the resolution are mostly dependent on the tip apex shape and size. Using tips with smaller inner diameters will result in pillars with smaller cross-sections.

FIGS. 3A-H show: (FIG. 3A) Potential transient during galvanostatic printing (I=−5 nA) of a Cu pillar from a micropipette with an inner diameter of 1 µm. (FIG. 3B) SEM side image of the self-supported straight pillar from (A) on a polished Cu foil substrate. Note the uniformity and outstanding surface finish, an important advantage of electrochemical 3D printing over conventional AM technologies such as PBF and DED. (FIG. 3C) SEM top view of the same pillar. Note the high density and lack of evident defects, an important advantage of electrochemical 3D printing over conventional AM technologies such as PBF and DED. (FIG. 3D-E) SEM images of Cu pillar printed at I=−1.5 nA from a micropipette with an inner diameter of 400 nm. (FIG. 3F) SEM image of two Cu pillars printed at I=−400 pA from a micropipette with an inner diameter of 100 nm. The inset shows a zoom-in image of the upper part of one pillar. (FIG. 3G) SEM image of an overhang pillar printed with a 1 µm tip and a constant lateral movement speed of 400 nm/s, resulting in an overhang angle of 80°. Lateral motion started after 1 min of vertical printing. One of the advantages of electrochemical 3D printing over conventional AM technologies could be the ability to manufacture items with overhang angles higher than 45° from the vertical, which is usually regarded as the threshold value, above which supports are needed in PBF processes. (FIG. 3H) Automatic printing of a 3×3 matrix of 1.5 µm pillars. Deposition current: −5 nA. Note that the high-aspect-ratio pillars in FIG. 3 neither deflect nor buckle under their own weight (i.e., the pillars are relatively stiff compared with their own weight) because, on small length scales—body forces are relatively ineffective at deforming structures compared to surface forces.

(FIG. 4A) SEM image of the cross-section extracted by focused ion beam (FIB)-SEM from of a 1.5 µm printed Cu pillar. (FIG. 4B) SEM image of the cross-section extracted by FIB-SEM from of a 500 nm printed Cu pillar. (FIG. 4C) The outer circumference of the pillar in (FIG. 4A). Comparing the surface finish of the laid pillar to that of the pure copper substrate polished down to 40 nm colloidal silica illustrates one of the advantages of electrochemical 3D printing—outstanding surface finish that cannot be achieved by conventional AM technologies such as PBF and DED. (FIG. 4D) Chemical analysis by energy dispersive X-ray spectroscopy (EDS), showing that the printed pillar is made of pure copper. (FIG. 4E) Scanning transmission electron microscope (STEM) image of a 500 nm in diameter pillar. (FIG. 4F) STEM electron diffraction pattern of (FIG. 4E). The four diffraction rings match, from inside outside, the (111), (200), (220) and (311) lattice planes of face-centered cubic (FCC) copper. No preferred orientation is evident in the z-direction. (FIG. 4G) Transmission electron backscatter diffraction (t-EBSD) inverse pole figure, z-direction coloring scheme, from the transverse cross-section of a 500 nm in diameter copper pillar. No preferred orientation is evident.

FIG. 5 reveals another advantage of electrochemical 3D printing over conventional AM technologies such as PBF and DED—materials printed with these conventional technologies are often not uniform in the z-direction (mainly, due to thermal effects).

FIGS. 6A-B show the copper grain size distributions based on t-EBSD analysis of: (FIG. 6A) transverse cross-section of a 500 nm printed copper pillar (see FIG. 4B), and (FIG. 6B) longitudinal cross-section of the same pillar (see FIG. 5). The difference in the average grain size may indicate a non-equiaxed grain structure. Using the Hall-Petch relationship, the yield strength of this copper pillar is estimated at 537 MPa, much higher than typical values for wrought copper C11000, either in the annealed or in the extra hard (H06) conditions. The high strength of the as-printed copper pillars may be attributed to their sub-micron grain size.

FIGS. 7A-B show the four-point probe test assembly for electrical resistivity measurements and typical characteristics of the as-printed pillars. (FIG. 7A) SEM image of the four-point probe test assembly prepared in the FIB microscope. [1] A silicon oxide substrate. [2] A 500 nm in diameter, ~20 µm long copper pillar positioned on the substrate. [3] The pillar is connected to four gold pads via platinum wires. After positioning the four probes, potential is applied while measuring current and potential through the outer and inner probe pairs, respectively. The average resistivity is calculated based on five measurements and the distance between the two inner platinum probes. (FIG. 7B) Four-point probe plot drawing the applied and measured potentials (left and right ordinates, black and blue graphs, respectively) versus the measured current. A linear, Ohmic behavior is evident. For the measured potential: slope=4.01Ω, $R^2$=0.99964. For the applied potential: slope=4.54Ω, $R^2$=0.99998.

FIG. 8 provides a Table summarizing the effects of the micropipette inner diameter on the printed copper pillar diameter, deposition current, deposition current density, and average deposition rate. As the pipette orifice diameter is reduced, both the printed pillar diameter and the associated deposition current decrease, whereas the current density and the related deposition rate increase. For a smaller-sized meniscus it is found that a higher current density can be applied while avoiding hydrogen evolution, probably as a result of a higher evaporation rate from the meniscus surface that causes higher mass transport within it. The maximum 3D printing rate monitored so far has been 300 nm/s (1,080 µm/h). This deposition rate is sufficiently high for many industrial applications.

DETAILED DESCRIPTION OF EMBODIMENTS

In the work leading to the development of the technology disclosed herein, the inventors developed a 3D electrochemical deposition system having a sub-micron resolution and based on an AFM together with the MCED method. Taking advantage of the AFM closed-loop control, this invention cancels the need for trial-and-error experiments, as the feedback loop recognizes deposition height and changes the distance as the experiment takes place. The printing method uses a special AFM tip made from hollow borosilicate glass (or quartz), which is used as the solution provider as well as part of the mechanical sensing system. Using this scheme, the inventors successfully demonstrated printing of different sized straight and overhang copper self-supported pillars on a polished copper substrate.

Figure 1:
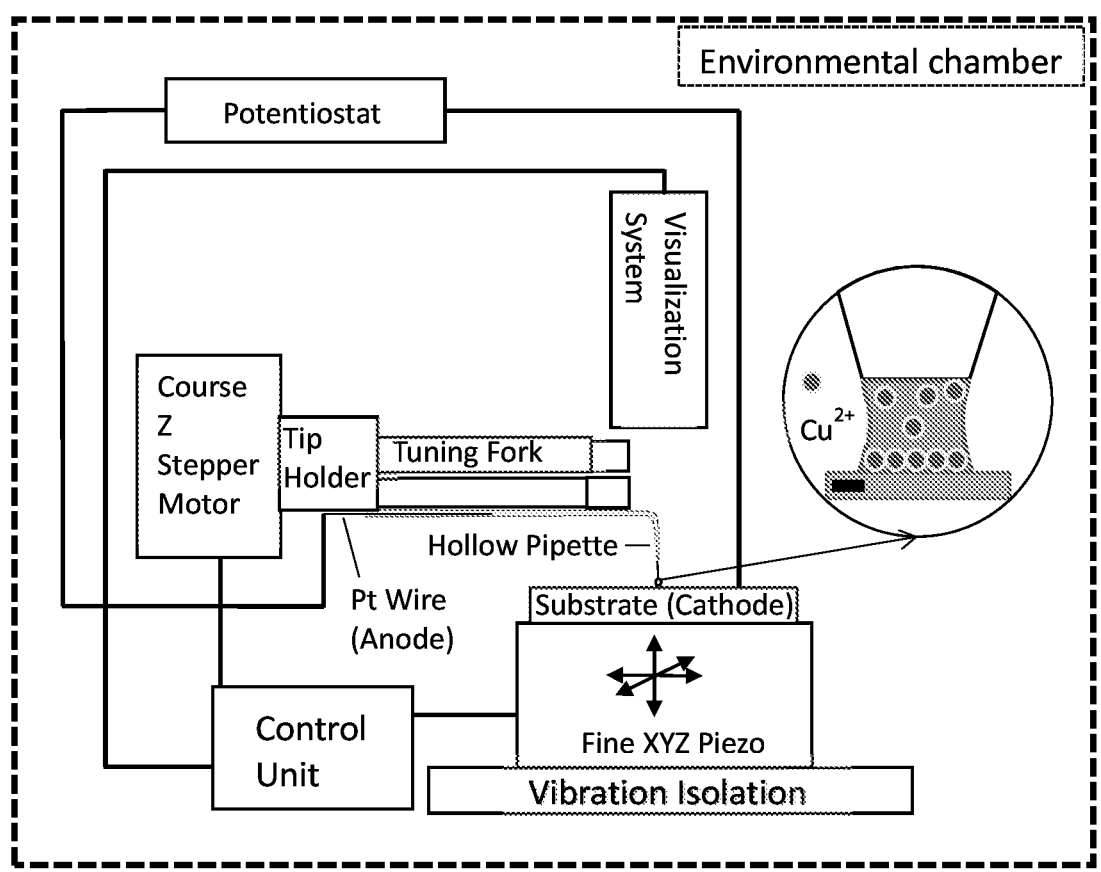
FIG. 1 is an illustration of an exemplary system used in accordance with the invention. The AFM is positioned inside an acoustic chamber, which serves as an environment chamber. The relative humidity percentage is regulated by passing air through a flask containing water directly to the chamber. The humidity inside the chamber is monitored with a thermohygrometer. The environment chamber is positioned on an anti-vibration table. An optical objective lens with a CCD camera is mounted above the tip in order to monitor its position in a continuous manner. The substrate is positioned on top of the piezo driver, which retracts the tip according to the feedback loop. A course stepper motor brings the tip to an initial connection with the substrate. A platinum wire is inserted to the back of the tip and is connected together with the conductive substrate to a SourceMeter. The inset shows a zoom-in of the pipette apex in proximity to the substrate, the liquid meniscus between them, and the reduction of the cations taking place.

A system according to the invention is constructed around either a commercialized or a homemade AFM, may include a vibration isolation table/plate, an environmental chamber, a sensitive SourceMeter, and a visualization system, as seen in FIG. 1. In order to achieve successful 3D printing, the system should have high sensitivity to forces applied on the tip, fast response, and a rigid structure. Thus, the tip cantilever does not deflect by the weight of the solution or the surface tension force (snap on/off). A hollow glass AFM tip connected to the bottom cantilever of a tuning fork (see FIG. 2A) and working in tapping mode with phase feedback was found effective in meeting all operational requirements, resulting in uniform deposition.

Figure 3F:
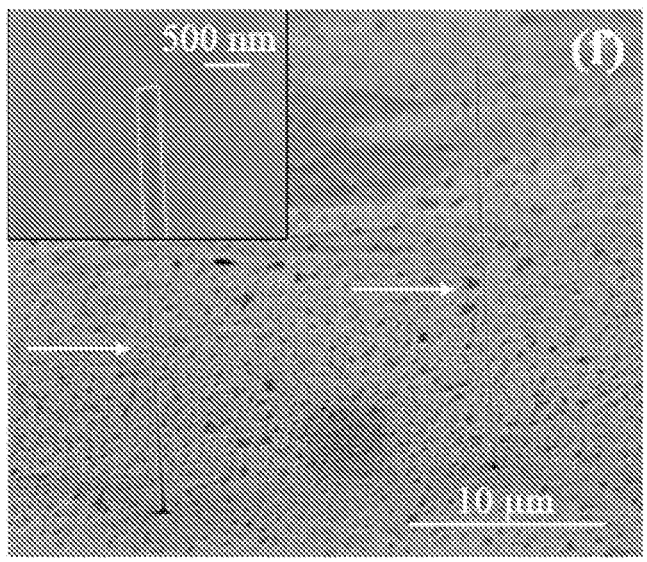
Figure 3G:
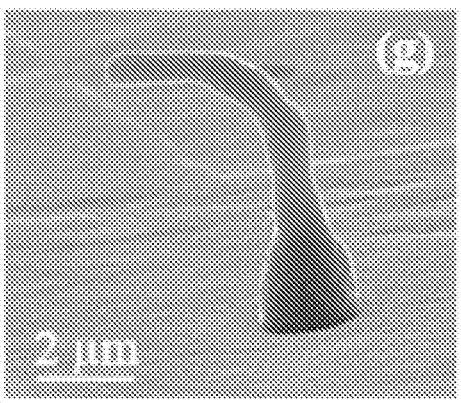
Figure 3H:
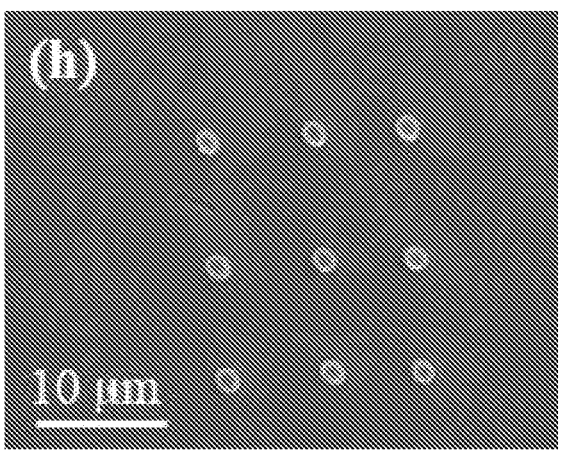

In order to deposit 3D copper features, the AFM tip was filled with an acidic (pH=1) aqueous electrolyte solution consisted of 50 mM copper (II) sulfate pentahydrate ($CuSO_4 \cdot 5H_2O$) and 50 mM sulfuric acid ($H_2SO_4$). Before inserting to the pipette, the solution was filtered through a 0.2 µm syringe filter, in order to prevent clogging by large particles. When using micropipettes with an orifice smaller than 500 nm in diameter, the solution was filtered through a 100 kDa centrifugal filter. A two-electrode configuration was used. The counter electrode was either a 25 µm or 50 µm in diameter 99.99% pure platinum wire. Because the highest applied currents were of the order of only few nanoamperes, the polarization of the platinum wire can be assumed negligible, and it can be regarded as a pseudo reference electrode. The substrate (working electrode) was 675 µm thick, 99.9% pure copper foil. The foil was first ground with SiC papers, from 240 P down to 2400 P. Next, it was polished with a 1 µm diamond suspension, followed by 40 nm colloidal silica suspension. Then, it was rinsed with water, placed in a chemical glass with deionized water, sonicated for 5 min, rinsed again with water, rinsed with ethanol, and dried with cold blowing air. After electrochemical printing, the substrate was cleaned with a droplet of ethanol and dried again. A current (or potential) was applied between a platinum wire and a copper foil substrate using a SourceMeter, which was controlled via a freeware software. A potential of ca. −1.0 V (vs. Pt) was found to give good deposition rate while avoiding hydrogen evolution, which might cause instability of the meniscus. The relative humidity (RH) was maintained constant between 60% and 70%. The RH affects the wettability properties of the surfaces as well as the evaporation rate of water from the liquid bridge, which both influence the quality of the printed item. Using hollow borosilicate glass pipettes with orifice diameters of 1 µm, 400 nm, and 100 nm, printed pillars with diameters of 1.5 µm, 500 nm, and 250 nm, respectively, as can be seen in FIGS. 3 and 4. The printed pillars had uniform and exceptionally smooth surfaces, and reached a height-to-diameter ratio (i.e., aspect ratio) of more than 100.

In order to study the capability to print overhang structures, a designated feature in the AFM software was exploited. 3D printing of overhang pillars took place by keeping the closed-loop control "on" and adding a horizontal movement in a predefined speed and path. FIG. 3G presents a structure printed in one continuous motion at a constant lateral movement speed of 400 nm/s, resulting in an overhang angle of 80°. Lateral motion started after 1 min of vertical printing. As the lateral speed was decreased from 400 to 100 nm/s, the overhang angle decreased from 80° to 40°. Lateral speeds higher than 400 nm/s caused the meniscus to break. Owing to the meniscus shape, it is more difficult to maintain a steady connection while moving horizontally, especially when there is no closed-loop control that corrects the tip position.

Examining the printed structures, it is clear that they possess smooth and uniform surfaces (FIGS. 3B & 4C) attributed to the high and constant current density in addition to the closed-loop controlled motion that maintains a constant distance between tip and substrate. The composition as well as the inner structure of the pillars were characterized. Transverse and longitudinal cross-sections were prepared with a FIB. Examining the different cross-sections (FIGS. 3C,E, 4A,B,E and 5), it can be seen that the electrochemical 3D printing led to dense features, with almost no porosity detected. Samples for EDS were prepared by FIB microscope down to a thickness of several microns, and were kept in a desiccator until characterization. EDS analysis (FIG. 4D) indicated chemical composition of pure copper (Pt peaks are also evident, but they are related to sample preparation).

Figure 4A:
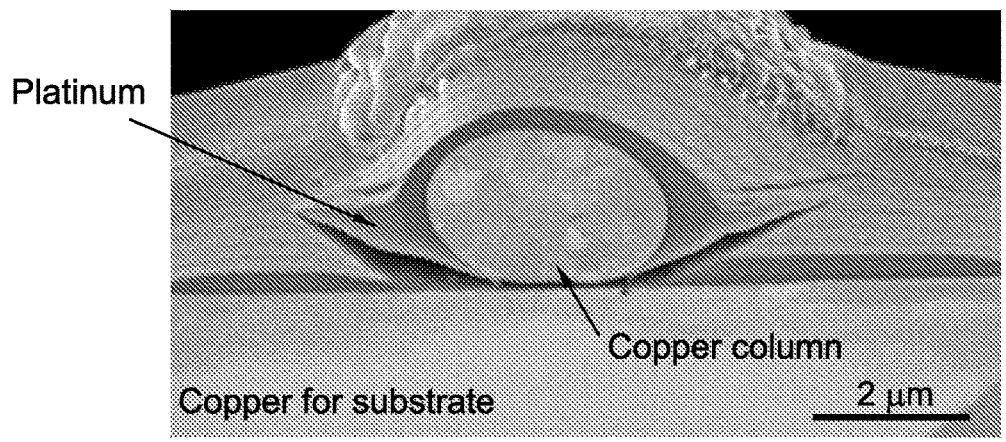
FIGS. 4A-G present characterization of the chemical composition, microstructure, surface and cross-section of printed copper pillars.
Figure 4B:
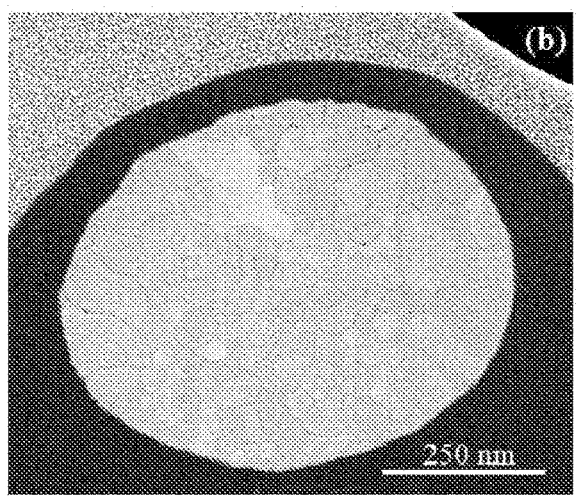
Figure 4C:
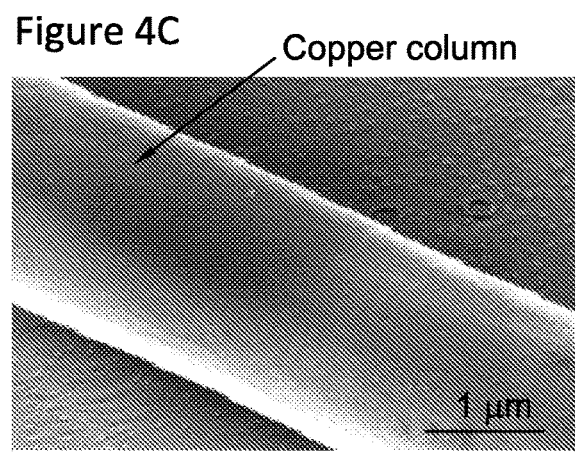
Figure 4D:
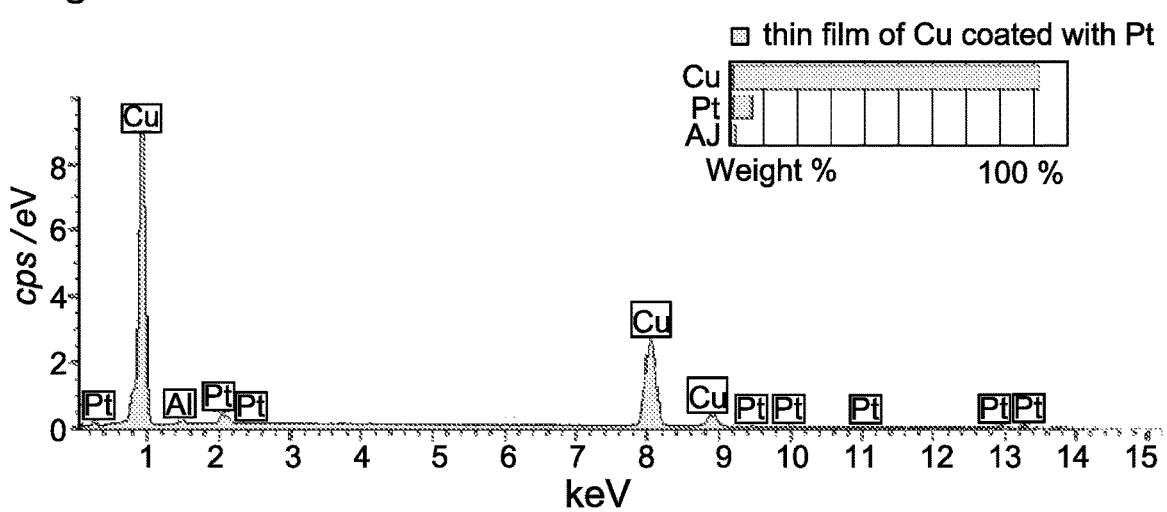
Figure 4F:
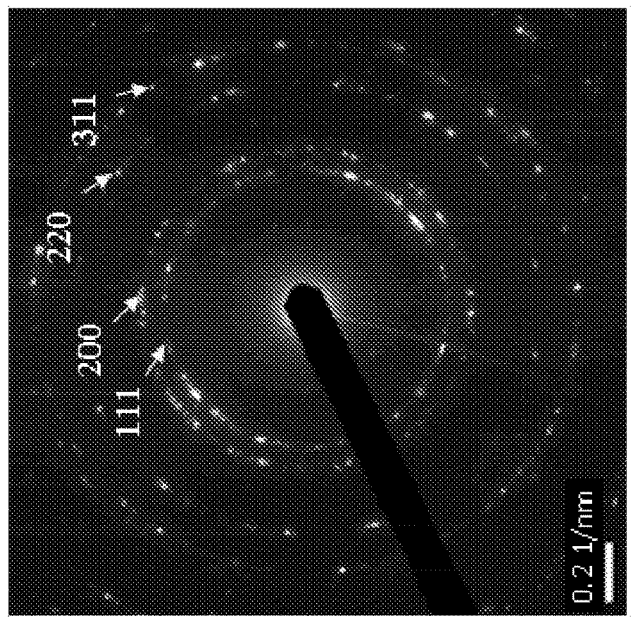
Figure 4E:
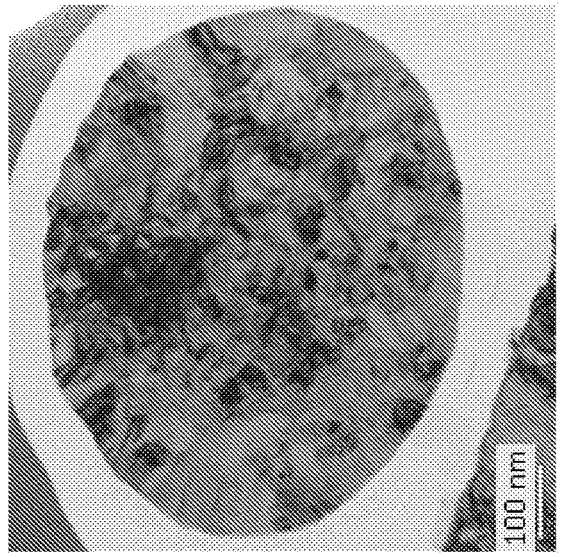
Figure 4G:
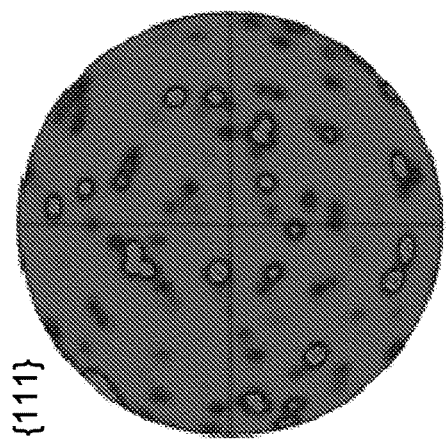
Figure 4G:
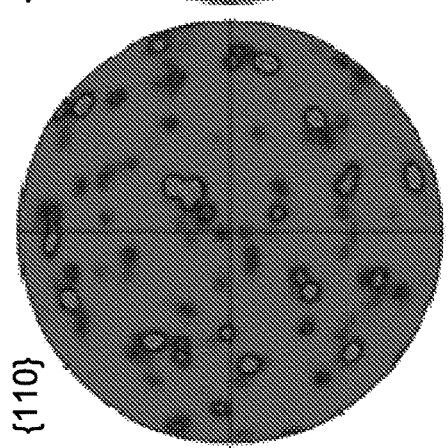
Figure 4G:
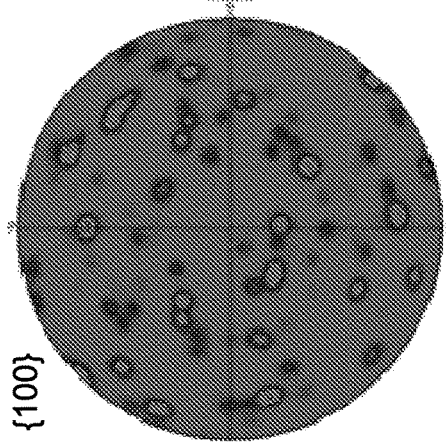

Thin samples (~70 nm thick) were prepared by FIB, were placed on a TEM copper grid, and were used for t-EBSD (also known as transmission Kikuchi diffraction, TKD) characterization inside the SEM as well as for STEM characterization, FIG. 4A,B,E.

Electron diffraction conducted in the STEM (FIG. 4F) supports the EDS results, showing a rings pattern corresponding to the lattice planes of the FCC copper structure. t-EBSD measurements showed that the inner structure of the 500 nm pillar had no preferred orientation, and that the average grain size was 62±24 nm (n=45). Measuring the average grain size manually on microscope images, using the Heyn lineal intercept procedure, gave a similar, yet more accurate, value of 49±3 nm. In comparison, the corresponding value for the larger (1.5 μm in diameter) cross-section was much higher: 158±13 nm. The larger grain size can be attributed to the lower deposition current density (282 vs. 500 mA/cm$^2$). Substituting $\sigma_0$=40 MPa and k=0.11 MPa m$^{1/2}$ into the Hall-Petch relationship, we estimate the yield strength of copper in the 1.5 μm and 500 nm pillars to be 317 MPa and 537 MPa, respectively.

Figure 5:
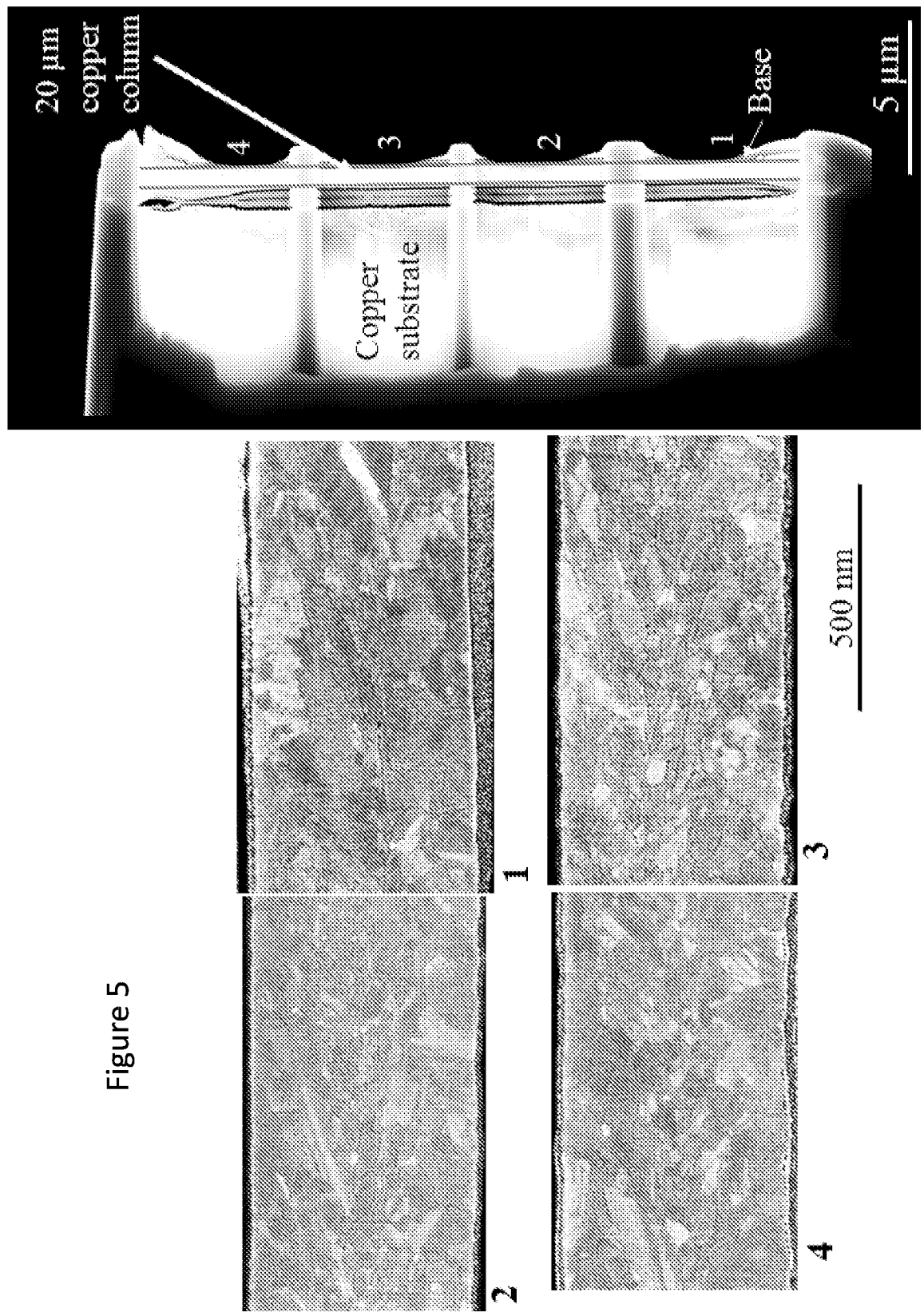
FIG. 5 shows a longitudinal cross-section from a 500 nm in diameter, 20 µm high printed copper pillar. On the right is a STEM image of the pillar, divided to four parts in order to avoid collapse. Corresponding SEM images of the four parts are shown on the left. It is evident that the material is fully dense, and that there is some change in the grain size from the central axis of the pillar (where it is smaller) to the surface (where it is larger). The second characteristic is probably the result of recrystallization at the pillar's surface over time, which is typical of nanocrystalline copper structures at ambient conditions as a result of the high energy stored.
Figure 6A:
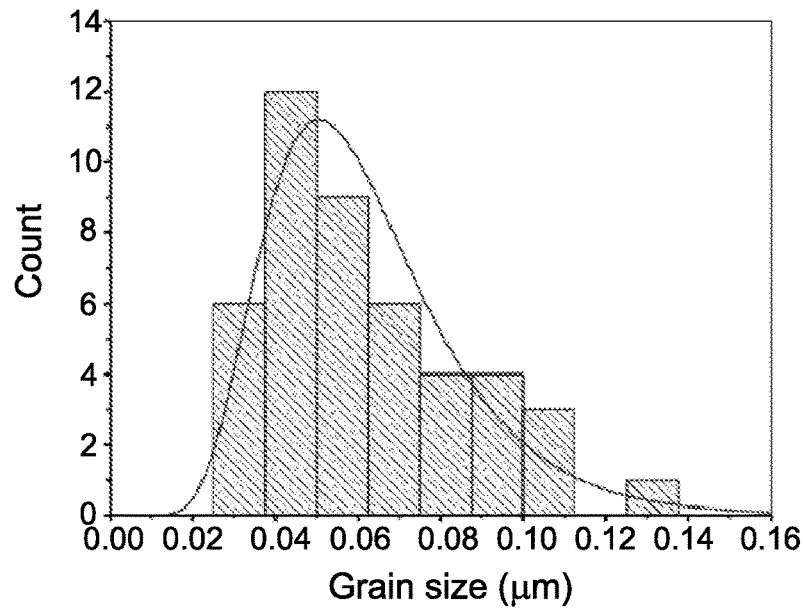
Figure 6B:
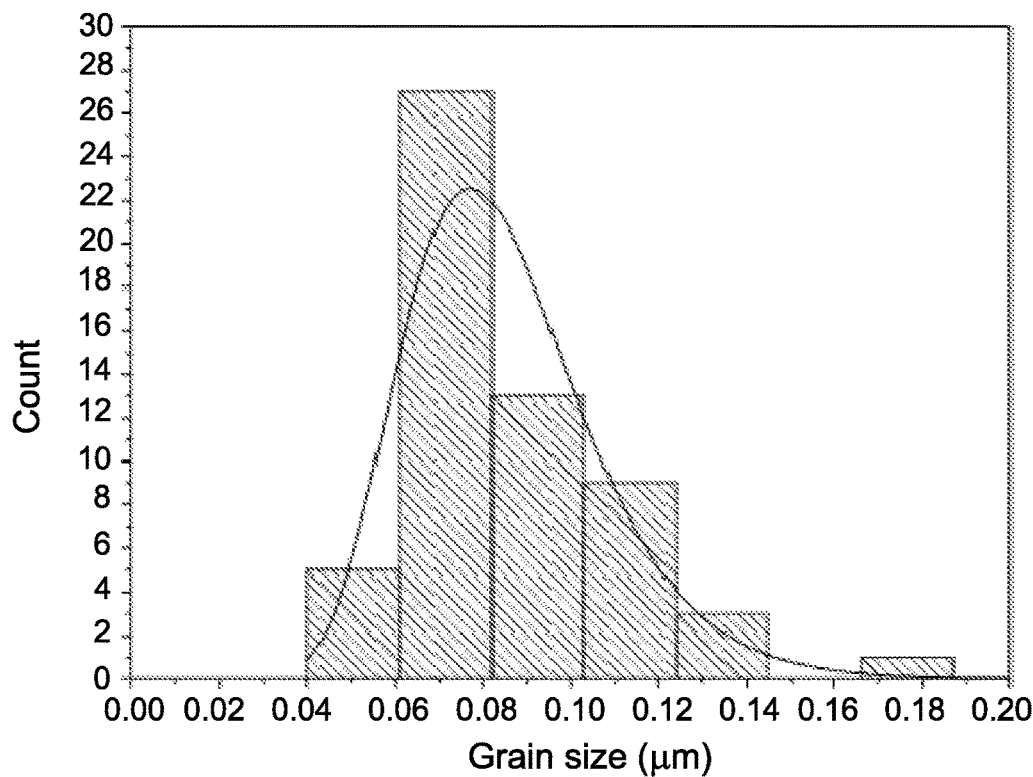

A longitudinal cross-section of a 20 μm high, 500 nm in diameter, printed pillar was also characterized, FIG. 5. It is evident that the material is fully dense, and that there is some change in the grain size from the central axis of the pillar (where it is smaller) to the surface (where it is larger). The second characteristic could result either from higher ion concentration at the liquid/solid interphase, which causes larger grain growth, or from recrystallization at the pillars surface over time, which is typical of nanocrystalline copper structures at ambient conditions as a result of the high energy stored. Since no grain growth was observed near the circumference of the transverse cross-sections that were stored for shorter times before FIB-SEM characterization, it is believed that recrystallization is more likely the cause of this grain growth here. Both SEM and t-EBSD measurements yielded grain size of 85±25 nm (n=58), i.e., significantly larger than in the transverse cross-section. This may indicate a non-equiaxed grain structure. As shown in FIG. 3B,E,G, the base of the printed pillar is of larger diameter. The larger base size can be attributed to a small tip-to-substrate distance and approach speed, as well as to the hydrophilic nature of copper. The grains in this zone are also larger, which can be related to less cathodic deposition potential/current density (see FIG. 3A) and, hence, lower nucleation rates and higher grain growth rates.

Measurement of the electrical resistivity of the printed structures is of interest for many applications. In addition, high electrical conductivity of the as-printed feature could indicate on a fully dense material, with a low concentration of defects such as impurities and defected interfaces between printed layers. The assembly for four-point probe measurements is shown in FIG. 7A. The potential vs. current plot for a 500 nm in diameter, ~20 μm long pillar (FIG. 7B) reveals an Ohmic behavior (i.e., metallic nature) with a slope of 4.01Ω. The average resistivity is 3.15×10$^{-7}$ Ω·m, an order of magnitude higher than pure bulk oxygen-free high copper in its annealed condition at 20° C. This, however, may be related to the Pt contact resistance (that generates heat) rather than to an inherent property of printed copper. Moreover, this resistivity value is similar to that reported for nano-grained copper pillars, and could thus be related to electron scattering by high density of grain boundaries. Pulsed electrodeposition (PED) or higher current densities can be used to obtain a structure of high-density nanoscale twins, which exhibits superior mechanical and electrical properties compared to coarse-grained and nano-grained structures.

Experimental Section

Microprinting System: As a proof of concept, the system was constructed around an AFM (Multiview 1000, Nanonics, Jerusalem, Israel). The AFM is controlled via a LabVIEW-based designated software (NWS, Nanonics, Jerusalem, Israel). The AFM piezo motor has a range of 80 μm in the x and y axes, and 65 μm in the z-axis. The AFM was positioned inside an acoustic chamber (PicolC, Molecular Imaging, Phoenix, AZ, USA), which served as an environment chamber, maintaining constant relative humidity of 60-70%. The relative humidity percentage was regulated by passing air through a flask containing water directly to the chamber. The humidity inside the chamber was monitored with a thermohygrometer (608-H1, Testo, Lenzkirch, Germany), while the flow control was done manually. The environment chamber was positioned on an anti-vibration table (78-227-12R/CleanTop® II, TMC/Ametek, PA, USA). The printed pillars were too small for in situ optical monitoring. However, an optical objective lens (zoom 6000, Navitar, New York, USA) with a 3.2-megapixel digital camera (ColorView 2, Olympus, Tokyo, Japan) was mounted above the tip in order to monitor its position in a continuous manner Illustration of the microprinting system is given in FIG. 1.

Figure 2A:
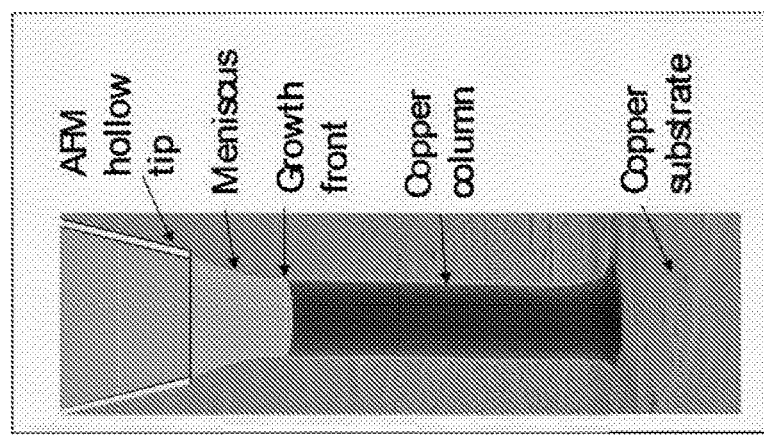
FIGS. 2A-B show.
Figure 2B:
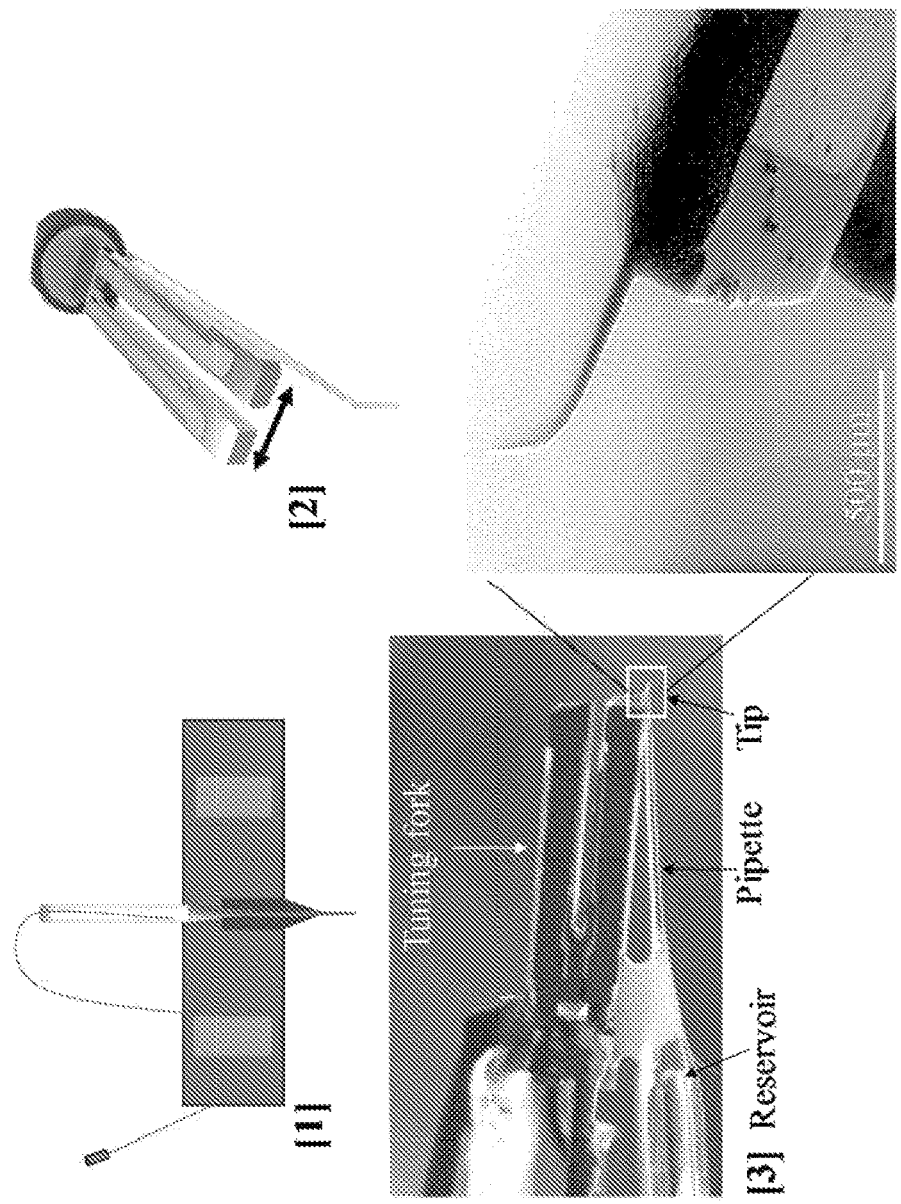

Micropipettes: Specially designed AFM tips (Nanonics, Jerusalem, Israel) with pipette orifice diameters of 1 μm, 400 nm, and 100 nm were used. The origin borosilicate glass or quartz tubes were heated and pulled using a laser puller (P-2000, Sutter, CA, USA). Beam-bounce tips were coated with gold by CVD and glued to a magnetic holder, while tips with tuning fork were connected through a UV glue both to the tuning fork and to a special adapter. When the tuning fork is connected perpendicular to the ground, the pipette is connected beneath it, facing down, and the tip is referred to as NTF. In contrast, when connected horizontally, the pipette is attached to it from the side, and the tip is referred to as a LTF tip (FIG. 2A). The final tips had a cantilever length of 100-1000 μm, a backside opening of 500 μm, a ratio of 2:1 between their external and inner diameters, a high spring constant (k>20 N/m), and a resonance frequency of around 34.2 kHz (with tuning fork feedback).

The Substrate and the Two-Electrode Electrochemical Cell Configuration: A two-electrode configuration was used. The counter electrode was either a 25 μm or 50 μm in diameter 99.99% pure platinum wire (GoodFellow, Huntingdon, England). The substrate (working electrode) was 675 μm thick, 99.9% pure copper foil (Alfa-Aesar, MA, USA). The foil was first ground with SiC papers, from 240 P down to 2400 P. Next, it was polished with a 1 μm diamond suspension, followed by 40 nm colloidal silica suspension. Then, it was rinsed with water, placed in a chemical glass with deionized water, sonicated for 5 min, rinsed again with water, rinsed with ethanol, and dried with cold blowing air. After electrochemical printing, the substrate was cleaned with a droplet of ethanol and dried again. A current (or potential) was applied between a platinum wire and a copper foil substrate using a SourceMeter (2450-EC Electrochemistry Lab System, Keithley, Beaverton, Oregon, USA). The SourceMeter was controlled via a freeware software (KickStart, Tektronix, Beaverton, Oregon, USA).

The Electrolyte Solution for Printing Pure Copper: The acidic (pH=1) aqueous electrolyte solution for electrochemical printing consisted of 50 mM $CuSO_4 \cdot 5H_2O$ (copper (II) sulfate pentahydrate, 99%, Alfa-Aesar, MA, USA) and 50 mM $H_2SO_4$ (sulfuric acid, 95.0-98.0%, Sigma-Aldrich, MO, USA). Before inserting to the pipette, the solution was filtered through a 0.2 μm syringe filter (Minisart, Sartorius, Gottingen, Germany), in order to prevent clogging by large particles. When using micropipettes with an orifice smaller than 500 nm in diameter, the solution was filtered through a 100 kDa centrifugal filter (Amicon Ultra-4, Merck, NJ, USA).

Characterization of the Printed Copper Pillars: High-resolution secondary and backscattred electrons images were acquired using a SEM (Quanta 200 FEG ESEM, FEI, MA, USA). The chemical composition of the printed pillars was determined by EDS (INCA detector, Oxford Instruments, Abington, UK) integrated in the SEM system. Samples for EDS were prepared by FIB microscope (Helios NanoLab 600 DualBeam, FEI, MA, USA) down to a thickness of several microns, and were kept in a desiccator until characterization. Samples prepared by FIB and placed on a TEM copper grid were used for t-EBSD characterization inside the SEM. Images were processed with a designated software (AZtecHKL, Oxford Instruments, Abington, UK). Grain size distribution was obtained from t-EBSD data, and was compared to manual calculation from SEM images, using the Heyn Lineal Intercept Procedure. Bright-field and dark-field images as well as electron diffraction patterns were acquired using a STEM (JEM 2010F, JEOL, Tokyo, Japan). Samples for STEM characterization were prepared in a FIB microscope, down to a thickness of 70 nm. The STEM images were processed with a DigitalMicrograph software (Gatan, Pleasanton, CA, USA). Electrical resistivity measurements were conducted on pillars 500 nm in diameter and ~20 µm long. A silicon wafer with a 600 nm silicon oxide ($SiO_2$) layer was used as the substrate in four-point probe measurements. Four 50 nm thick gold pads were deposited onto the wafer by lithography. The Cu pillars were positioned on the substrate inside the FIB microscope, and were connected to the gold pads by platinum wires, as shown in FIG. 7A. Electrical measurements were conducted in ambient environment, using a four-probe station (Janis, Woburn, MA, USA). In a dual-channel SourceMeter (2603B, Keithley, Cleveland, OH, USA), the two inner probes were connected to one SMU, while the outer probes to the second one. A potential was applied between the two outer pads, and the current was measured. Potential was measured on the inner connections, eliminating the effect of contact resistance. To prevent excessive heating due to the relatively high resistance of the Pt connections, each potential was measured separately, for a short period of time.

The invention claimed is:

1. A meniscus-confined electrochemical deposition method, the method comprising
dispensing through a deposition tool an amount of an electrolyte solution containing a reducible material onto a surface of a substrate, thereby forming a liquid bridge between a tip of the deposition tool and the surface,
causing said reducible material in the liquid bridge to undergo reduction,
measuring a change in a force applied on the deposition tool with respect to the substrate while the material is deposited, such that when a change in the force is measured/detected, the position of the deposition tool or the substrate is modified vertically with respect to the other, such that dispensing of a further amount of the electrolyte solution onto the reduced material does not detach the liquid bridge between the tip and the reduced material, and
repeating the method one or more times to afford a deposited object on the surface;
wherein the method is carried out under air or under an inert gas or wherein the method is carried out while the substrate is immersed completely or partially in an electrolyte bath.

2. The method according to claim 1, the method comprising
(a) providing a deposition tool in a form of an electrolyte solution reservoir comprising a reducible form of at least one material, the deposition tool having an end tip for dispensing an amount of the electrolyte solution,
(b) positioning the tip at a distance from the surface of the substrate,
(c) dispensing a first amount of the electrolyte solution onto the surface of the substrate, thereby forming a liquid bridge between the tip and the substrate's surface, and
(d) causing reduction of the reducible form of the at least one material in the liquid bridge.

3. The method according to claim 2, further comprising measuring a change in the force applied on the tip, and modifying the tip-to-substrate distance by normal or lateral movement.

4. The method according to claim 1, wherein the deposition tool has a dispensing tip in the form of a micropipette with a microscopic or nanoscopic opening, said opening being optionally between 40 nm and 5 µm.

5. The method according to claim 1, wherein the deposition tool comprises a plurality of reservoirs, each reservoir having different or independent dispensing tips.

6. The method according to claim 1, wherein the deposition tool comprises a plurality of reservoirs, at least a portion or all of said plurality of reservoirs being connected to a single dispensing end.

7. The method according to claim 4, wherein the micropipette is an AFM tip.

8. The method according to claim 4, wherein the micropipette is in a form of a hollow glass tube.

9. The method according to claim 1, for fabricating nanowires, high-density interconnects, sub-micron scale circuitry, conductive bridges and precise electrical connections, thermocouples, interposers, high-frequency terahertz antennas, probe arrays and precision sensors; for fabricating micro- or nano-electromechanical systems, batteries and fuel cells; or for repairing or modifying micro-sized or nano-sized features.

10. A meniscus-confined electrochemical deposition method, the method comprising
dispensing through a deposition tool an amount of an electrolyte solution containing a reducible material onto a surface of a substrate, thereby forming a liquid bridge between a tip of the deposition tool and the surface,
causing said reducible material in the liquid bridge to undergo reduction,
measuring a change in a force applied on the deposition tool with respect to the substrate while the material is deposited, such that when a change in the force is measured/detected, the position of the deposition tool or the substrate is modified vertically with respect to the other, such that a liquid bridge containing an amount of the electrolyte solution is maintained during dispensing of a further amount of the electrolyte solution onto the reduced material, and
repeating the method one or more times to afford a deposited object on the surface;

wherein the method is carried out under air or under an inert gas or wherein the method is carried out while the substrate is immersed completely or partially in an electrolyte bath.

11. The method according to claim 1, further comprising measuring a change in a distance between the tip of the deposition tool and the surface.

12. The method according to claim 1, wherein a tuning fork is used for determining a change in the force.

13. The method according to claim 11, wherein the measuring of the change in distance is by use of a tuning fork.

14. The method according to claim 10, further comprising measuring a change in a distance between the tip of the deposition tool and the surface.

15. The method according to claim 10, wherein a tuning fork is used for determining a change in the force.

16. The method according to claim 14, wherein the measuring of the change in distance is by use of a tuning fork.

* * * * *